(12) United States Patent
Goldblatt et al.

(10) Patent No.: US 7,371,713 B2
(45) Date of Patent: May 13, 2008

(54) PREPARATION OF MONOMERS FOR GRAFTING TO POLYOLEFINS, AND LUBRICATING OIL COMPOSITIONS CONTAINING GRAFTED COPOLYMER

(75) Inventors: Irwin L. Goldblatt, Edison, NJ (US); Shean-Jer Chen, Bridgewater, NJ (US); Manish R. Patel, Parlin, NJ (US); Stephen T. McKenna, Naperville, IL (US)

(73) Assignee: Castrol Limited, Swindon, Wiltshire (GB)

( * ) Notice: Subject to any disclaimer, the term of this patent is extended or adjusted under 35 U.S.C. 154(b) by 700 days.

(21) Appl. No.: 10/444,548

(22) Filed: May 23, 2003

(65) Prior Publication Data

US 2004/0043909 A1     Mar. 4, 2004

Related U.S. Application Data

(60) Provisional application No. 60/383,845, filed on May 29, 2002, provisional application No. 60/383,204, filed on May 24, 2002.

(51) Int. Cl.
C10M 159/12 (2006.01)
C08F 255/00 (2006.01)

(52) U.S. Cl. ............... 508/221; 508/231; 508/232; 508/242; 508/454; 525/282; 525/285; 525/296; 525/327.6

(58) Field of Classification Search ................ 508/221
See application file for complete search history.

(56) References Cited

U.S. PATENT DOCUMENTS

| | | | |
|---|---|---|---|
| 3,873,459 A | 3/1975 | Pawlak | |
| 4,092,255 A | 5/1978 | Chapelet et al. ............. | 252/50 |
| 4,146,489 A | 3/1979 | Stambaugh et al. .......... | 252/50 |
| 4,160,739 A | 7/1979 | Stambaugh et al. | |
| 4,320,019 A | 3/1982 | Hayashi ..................... | 252/51.5 |
| 4,640,788 A | 2/1987 | Kapuscinski et al. ...... | 252/51.5 |
| 4,693,838 A | 9/1987 | Varma et al. | |
| 5,167,845 A | 12/1992 | DeRosa et al. ............ | 252/47.5 |
| 5,219,480 A | 6/1993 | Gutierrez et al. ......... | 252/51.5 |
| 5,298,565 A | 3/1994 | Lange et al. ............... | 525/279 |
| 5,328,624 A | 7/1994 | Chung | |
| 5,346,635 A | 9/1994 | Khorramian et al. | |
| 5,424,357 A | 6/1995 | Larson ....................... | 524/765 |
| 5,424,367 A | 6/1995 | Auda et al. ................. | 525/285 |
| 5,427,702 A | 6/1995 | Chung et al. ............. | 252/51.5 |
| 5,439,605 A | 8/1995 | Khorramian et al. | |
| 5,523,008 A | 6/1996 | Boden et al. .................. | 252/50 |
| 5,563,118 A * | 10/1996 | Mishra et al. .............. | 508/454 |
| 5,663,126 A | 9/1997 | Boden et al. ............... | 508/221 |
| 5,814,586 A | 9/1998 | Boden et al. ............... | 508/221 |
| 5,874,389 A | 2/1999 | Boden et al. ............... | 508/221 |
| 6,034,038 A | 3/2000 | Lockwood et al. | |
| 6,107,257 A * | 8/2000 | Valcho et al. .............. | 508/221 |
| 6,248,702 B1 * | 6/2001 | Coolbaugh et al. ......... | 508/189 |
| 6,300,289 B1 | 10/2001 | Boden et al. ............... | 508/221 |
| 6,410,652 B1 | 6/2002 | Goldblatt et al. ........... | 525/279 |
| 6,686,321 B2 | 2/2004 | Boden et al. | |
| 2005/0209113 A1 | 9/2005 | Goldblatt | |
| 2006/0205611 A1 | 9/2006 | Sauer | |

FOREIGN PATENT DOCUMENTS

| | | | |
|---|---|---|---|
| CN | 1137283 | 12/1995 | |
| DE | 19607641 A1 | 9/1997 | |
| EP | 0000648 | 2/1979 | |
| EP | 0336716 | 10/1989 | |
| EP | 0352070 | 1/1990 | |
| EP | 0352072 | 1/1990 | |
| EP | 0837122 | 4/1998 | |
| EP | 0837122 A2 | 4/1998 | |
| EP | 0980891 | 2/2000 | |
| EP | 1533293 | 5/2005 | |
| GB | 1390851 | 4/1975 | |
| GB | 2097800 | 11/1982 | |
| IN | 738/MMNP/2004 | 4/2005 | |
| SG | 112056 | 6/2005 | |
| WO | WO 95/16744 | 6/1995 | |
| WO | WO 95/18199 | 6/1995 | |
| WO | WO 97/47709 | 12/1997 | |
| WO | WO 01/19882 | 3/2001 | |
| WO | WO0119882 A1 | 3/2001 | ................. 255/6 |
| WO | WO03/099890 | 12/2003 | |
| WO | WO2006/099250 | 9/2006 | |
| WO | WO2006116663 | 11/2006 | |

OTHER PUBLICATIONS

Aldrich Handbook of Fine chemicals 1996-1997: p. 986 Cat. No. 14607-2.
Australian Patent Office Search Report Application No. SG 200406722-9 Feb. 24, 2006.

\* cited by examiner

*Primary Examiner*—Ellen M. McAvoy
(74) *Attorney, Agent, or Firm*—McAndrews, Held & Malloy, Ltd.

(57) ABSTRACT

A graft copolymer containing one or more ethylenically-unsaturated, aliphatic or aromatic, nitrogen- and oxygen-containing graftable monomers grafted to a polyolefin is disclosed. Novel monomers, methods of making such monomers, and graft copolymers comprising such monomers are based on reacting an acylating agent with an amine to form a reaction product. The reaction product may include more than one chemical compound formed from the combination of the acylating agent and the amine. The monomer is the graftable, ethylenically unsaturated, aliphatic or aromatic, nitrogen- and oxygen-containing compound(s) of the reaction product. The monomer may, but need not, be recovered from the product mixture. The preferred monomer is the reaction product of maleic anhydride and 4-aminodiphenylamine. Also described is a method of making a dispersant viscosity index improver. The monomer of the present invention may be grafted to a polyolefin in solutions or melts. Also described is a lubricating oil comprising a base oil and a grafted polyolefin as described above.

85 Claims, No Drawings

PREPARATION OF MONOMERS FOR GRAFTING TO POLYOLEFINS, AND LUBRICATING OIL COMPOSITIONS CONTAINING GRAFTED COPOLYMER

RELATED APPLICATIONS

This application claims the benefit under 35 U.S.C. § 119(e) of U.S. Provisional Application No. 60/383,204 ("the '204 application") filed on May 24, 2002 and of U.S. Provisional Application No. 60/383,845 ("the '845 application") filed on May 29, 2002. The '204 application and the '845 application are incorporated by reference in this specification.

TECHNICAL FIELD

The present invention relates to novel graft copolymers with polyolefin backbones. The polyolefins are grafted with reaction products having nitrogen and oxygen atoms and at least one point of ethylenic unsaturation.

The present invention further relates to novel monomers, methods of making such monomers, and graft copolymers comprising such monomers. The graft copolymers comprising these novel monomers are useful as dispersant viscosity index improvers.

The present invention further relates to methods for manufacturing these novel graft copolymers. The invention still further relates to lubricating oil compositions containing these novel grafted polyolefins as dispersant viscosity index improvers.

BACKGROUND OF THE INVENTION

Grafted copolymers of nitrogenous, heterocyclic monomers with polyolefins having pendant ethylenically unsaturated moieties have previously been proposed for use in lubricating oils as viscosity index improving (VII) agents and as dispersants for keeping the insoluble materials in the crankcase of an internal combustion engine in suspension. Among many graftable polyolefins suggested for this use are ethylene-propylene polyolefins, grafted with 0.3% by weight of N-vinylimidazole. U.S. Pat. No. 4,092,255, column 10, lines 52-53. Other examples in the same patent are "statistic" copolymers, which are distinguished from grafted copolymers. U.S. Pat. No. 4,092,255, column 4, lines 5-13.

Another material for use as both a viscosity index improver and a dispersant is a polymer containing N-vinyl pyrrolidone and an alkyl methacrylate. U.S. Pat. No. 4,146,489, column 1, lines 51-62.

Grafted polyolefins for use as lubricating oil additives have been prepared by dissolving the selected polyolefin in a solvent (which may be a lubricating oil base stock), adding an organic peroxide as a free radical generator (also referred to herein as an initiator), holding the mixture at an elevated temperature to form active sites on the polyolefin, adding the graftable monomer, and allowing the mixture to react at an elevated temperature for long enough to form the desired grafted polyolefin. U.S. Pat. No. 4,092,255, column 4, line 54, to column 5, line 12.

The prior art also suggests that the grafting reaction to form a dispersant VII grafted polyolefin can be controlled to avoid by-products by combining the polyolefin, graftable monomer, and initiator at a temperature below the initiation (reaction) temperature of the initiator, then heating the mixture to above that initiation (reaction) temperature to begin the reaction. U.S. Pat. No. 4,146,489. Example 1 of the '489 patent suggests that the initiation (reaction) temperature of di-t-butyl peroxide is between 160° C. and 170° C. Addition of the initiator in two stages is suggested in Example 4 of the same patent. A grafted polyolefin containing 1-10% by weight, preferably 2-6% by weight, most preferably about 3% by weight of the grafted monomer is taught. '489 patent, column 3, lines 11-15.

U.S. Pat. No. 5,523,008 describes a grafted polyolefin containing at least about 13 moles of N-vinylimidazole or other ethylenically-unsaturated nitrogen-containing and/or oxygen-containing monomers per mole of a grafted polyolefin backbone. Also described is a lubricating oil comprising a lubricant base oil and a grafted polyolefin as described above. Also described is a method of making a dispersant-viscosity index improver. N-vinylimidazole or other ethylenically unsaturated nitrogen-containing and/or oxygen-containing monomers and a graftable polyolefin are reacted with enough of an initiator to graft at least about 13 moles of the monomer to each mole of the polyolefin.

U.S. Pat. No. 5,663,126 describes a grafted polyolefin containing one or more of N-vinylimidazole, 4-vinylpyridine, and other ethylenically-unsaturated nitrogen-containing and/or oxygen-containing graftable monomers grafted to a polyolefin copolymer. Also described is a lubricating oil comprising a lubricant base oil and a grafted polyolefin as described above. Also described is a method of making a dispersant viscosity index improver. N-vinyl-imidazole or other ethylenically unsaturated nitrogen-containing and/or oxygen-containing graftable monomers and a graftable polyolefin are reacted with enough of an initiator to graft the monomer to the polyolefin. The initiator and/or graftable monomer is added to the other ingredients, maintained at the reaction temperature, over a period of time. The reaction temperature is maintained at a level high enough to give acceptable reaction times. The monomer and the initiator each can be added at a uniform, relatively slow rate during the reaction. Also described is a method of making a dispersant viscosity index improver using melt reaction conditions. U.S. Pat. Nos. 5,814,586, 5,874,389, and 6,300,289 claim priority through one or more continuations of the application that issued as U.S. Pat. No. 5,663,126 and accordingly have the same disclosure.

Other patents disclose the preparation of dispersant viscosity index improvers by reacting a polyolefin with an acylating agent, and thereafter reacting with an amine so as to form a copolymer having nitrogenous moieties. For example, U.S. Pat. No. 4,320,019 describes reaction products prepared by reacting (a) interpolymers of ethylene, one or more $C_3$-$C_8$ alpha-monoolefins, and one or more polyenes selected from non-conjugated dienes and trienes, with (b) one or more ethylenic carboxylic acid acylating agents to form an acylating reaction intermediate which is further reacted with (c) an amine. These reaction products are said to be useful as multi-functional additives to a variety of lubricating oils for enhancing their dispersancy as well as improving their viscosity-temperature relationship.

U.S. Pat. No. 5,424,367 describes a process for carrying out multiple sequential reactions in a single reactor. A polymer melt is reacted with a first set of reagents to form a grafted functional compound, and thereafter the polymer melt is reacted with a second and different set of reagents to include functionalities that are desired in the final product. The first set of reagents may be unsaturated mono- or poly-carboxylic acids and cyclic anhydrides, salts, esters, imides, amides, nitrites, and other substituted derivatives from said acids. A preferred grafted functional compound is maleic anhydride. The second set of reagents may include alcohols, thioalcohols, and amines, with amines being preferred. Suitable amines include primary amines, N-arylphenylenediamines, aminoperimidines, aminoindoles, aminoindazolinones, and aminomercaptotriazole.

SUMMARY OF THE INVENTION

The present invention provides novel monomers and methods of making such monomers. Such monomers may be used to prepare DVII's. One aspect of the invention is the preparation of a reaction product comprising one or more ethylenically unsaturated, aliphatic or aromatic monomers having nitrogen and oxygen atoms. For example, the reaction product obtained by reacting maleic anhydride and 4-aminodiphenylamine ("4-ADPA") contains graftable monomers. This reaction product is a mixture and contains, among other components, diphenylaminomaleimide and the corresponding amic acid. The graftable compounds are then grafted onto the polyolefin using free radical initiators. The graftable compounds may, but need not, be recovered from the reaction product.

The term "reaction product" as used in this specification refers to one or more compounds formed by the reaction of two or more reactants. The reaction product may include more than one chemical compound formed from the combination of the acylating agent and the amine, and in such instances, the term "reaction product" will be understood to refer to all such chemical compounds. The term "monomer" as used in this specification refers to the graftable, ethylenically unsaturated, aliphatic or aromatic, nitrogen- and oxygen-containing compound(s) of the reaction product. The monomer may or may not be recovered from the reaction product before carrying out the grafting reaction. The present methods may also comprise the step of recovering one or more graftable compounds from the reaction product of the acylating agent and the amine.

Another aspect of the invention is the graft reaction product of a polyolefin with an ethylenically unsaturated monomer having nitrogen and oxygen atoms. The present invention also provides polyolefin backbones grafted with ethylenically unsaturated, aliphatic or aromatic monomers containing oxygen and nitrogen atoms. It is also contemplated that the molar proportions of the grafted monomer to the polyolefin may be 0.5:1, 1:1, 2:1, 4:1, 8:1, 10:1, 12:1, 15:1, 20:1, 25:1, 40:1, 50:1, or even higher grafted monomer: backbone mole ratios.

Another aspect of the invention is a method of making a dispersant viscosity index improver. According to this invention, a graftable monomer and a polyolefin are provided. In some embodiments the polyolefin has pendant unsaturated sites for grafting. Sufficient initiator is provided to graft the graftable monomer to the polyolefin.

Another aspect of this invention is the grafting of an ethylenically-unsaturated, aliphatic or aromatic, nitrogen- and oxygen-containing, graftable monomer to a polyolefin backbone. The polyolefin may be reacted so that it contains at least about 1 mole of monomer per mole of polymer, though the ratio is not critical for all aspects of the invention. An illustrative monomer is obtained by reacting maleic anhydride and 4-aminodiphenylamine ("4-ADPA"). This monomer contains diphenylaminomaleimide and the corresponding amic acid. The monomer is then grafted onto the polyolefin using free radical initiators. The monomer may, but need not, be recovered from the reaction product. The polyolefin has a weight average molecular weight of from about 10,000 to about 750,000.

The polyolefin is dissolved in a solvent, forming a solution. The graftable monomer and the initiator are added to the solution. The graftable monomer and/or the initiator can be added gradually to the solution, and they can be added together or successively. The rate of addition of the graftable monomer can be from 0.1% to 100% of the entire charge of monomer per minute. The rate of addition of the initiator can be from about 0.1% to about 100% of the initiator charge per minute. The reaction temperature is maintained at a level which gives rise to a satisfactory reaction initiation rate. In one embodiment, the graftable monomer and the initiator are each added at a uniform, relatively slow rate during the reaction.

The resulting graft copolymer may have a monomer to polymer ratio of at least about 0.5:1, or alternatively at least about 1:1 or alternatively at least about 2:1 or alternatively at least about 4:1 or alternatively at least about 8:1 or more.

Additionally, the graft copolymer may be made by melt-blending a reaction product according to the present invention; a polyolefin; and an initiator. The reaction is carried out at a temperature and under conditions effective to graft the monomer onto the polyolefin. The graft copolymer under such circumstances exhibits a monomer to polymer ratio of at least about 0.5:1 or alternatively at least about 1:1 or alternatively at least about 2:1 or alternatively at least about 4:1 or alternatively at least about 8:1 or more.

Another aspect of the invention is a lubricating oil comprising a hydrocarbon base oil and a graft copolymer as described above. The present invention also provides lubricating oil compositions containing these graft copolymers in amounts effective to function both as viscosity index improvers and as dispersants.

The graft copolymer functions as a dispersant viscosity index improver, and has the property of raising the viscosity index of the lubricating oil blend by at least about 5 points when used at a 1 wt. % solids concentration in the blend. The dispersant viscosity index improver may be used in an amount which is from about 0.05% to 10% by weight of lubricating oil composition.

As compared with other oil formulations, such lubricating oils employ both the dispersancy and the viscosity improving properties of the graft copolymer, so less of the oil composition is occupied by dispersants. For example, a 5W-30 lubricating oil can be formulated which employs more of a low-volatility conventional base stock (which has a higher viscosity) than previous formulations. This allows the formulator greater latitude to formulate multi-viscosity compositions containing less volatiles from the base stock.

A significant benefit of the present invention is that the reduction in the amount of conventional dispersants improves the wear resistance of the composition in an internal combustion engine as compared with more conventional formulations.

The present invention also provides novel methods for manufacturing graft copolymers.

DETAILED DESCRIPTION OF THE INVENTION

While the invention will be described in connection with one or more preferred embodiments, it will be understood that the invention is not limited to those embodiments. On the contrary, the invention includes all alternatives, modifications, and equivalents as may be included within the spirit and scope of the claims concluding this specification.

Novel monomer according to the present invention are obtained by reacting acylating agents, such as maleic anhydride, with amines, such as 4-aminodiphenylamine ("4-ADPA"). The novel graft copolymer (also referred to herein as a grafted polyolefin), according to the present invention, is made by reacting a polyolefin with the graftable monomer of the present invention, in the presence of an initiator. The reaction may be carried out either on the solid/molten(melt) polyolefin in an extrusion reactor or on the polymer dissolved in a solvent.

In the following paragraphs are examples of reactants used in the preparation of (a) the graftable monomers, (b) grafted polyolefins, and (c) lubricating oil compositions. Also in the following examples are examples of the initiators, solvents, and optional inhibitors contemplated for use herein to make the graftable monomers and grafted polyolefins. Since the materials required to prepare the graftable monomers and the grafted polyolefins may differ, the components used in the preparation of the graftable monomer will be discussed separately from those used in the preparation of the grafted polyolefins. For example, the solvent requirements in the preparation of the monomer may differ from those needed in the preparation of the grafted polyolefin. As a further example, while limits may be set upon the concentration of aromatics in the solvent used in the preparation of the grafted polyolefin, such limits may not be necessary in the preparation of the graftable monomer. In addition, solvents having a higher degree of polarity are preferred in the preparation of the graftable monomer.

I. Materials and Methods for Preparation of Graftable Monomers

A. Solvents for use in the Preparation of Graftable Monomers

Useful solvents include volatile solvents which are readily removable from the monomer after the reaction is complete or ones which are not readily volatilized and removed after completion of the reaction. Any solvent may be used which can disperse or dissolve the reaction product and may be handled in such a way as not to participate appreciably in the reaction or cause side reactions to a material degree or interfere with subsequent processes which utilize the graftable monomer. Several examples of solvents of this type include straight chain or branched chain aliphatic or alicyclic hydrocarbons, such as n-pentane, n-heptane, i-heptane, n-octane, i-octane, nonane, decane, cyclohexane, dihydronaphthalene, decahydronaphthalene, and relatively volatile aromatics such as toluene, xylene, and ethylbenzene and others not listed. Nonreactive halogenated aromatic hydrocarbons such as chlorobenzene, dichlorobenzene, trichlorobenzene, dichlorotoluene and others are also useful as solvents. Aliphatic or aromatic ketones, ethers, esters, formamides, carbonates, water etc., are also contemplated as solvents herein. Also contemplated are mixtures of solvents.

Examples of the ketones, ethers, esters, formamides, carbonates, etc. which are contemplated include, but are not limited to, acetone, methylethyl ketone, diethyl ketone, N,N-dimethylformamide, N,N-diethylformamide, N,N-dimethylacetamide, diethyl carbonate, propylene carbonate, diethyl ether, dimethyl ether, isopropyl ether, 2-methoxyethyl ether, dioxane, dimethyl sulfoxide, butyl acetate, ethyl acetate, and dimethyl malonate.

The solvents useful here also include base oils or base stocks, as defined in ASTM D 6074-99, "Standard Guide for Characterizing Hydrocarbon Lubricant Base Oils" which may be suitable for incorporation into a final lubricating oil product. In this specification, the term base oil includes base oils and base stocks. Any base oil may be used which can disperse or dissolve the reaction product without materially participating in the reaction or causing side reactions to an unacceptable degree. For example, solvent dewaxed and hydrocracked base oils, paraffin and isoparaffin fluids, base oils which contain low or moderate levels of aromatic constituents, and fluid poly-α-olefins are contemplated for use herein. The use of base oils having aromatic constituents, while being less than optimum in some instances, is contemplated under this disclosure.

For example, suitable base oils of this kind include, but are not limited to 100 SUS, 130 SUS, or 150 SUS low pour solvent neutral base oils, sold as lubricant base oils by ExxonMobil Corporation. Also base oils marketed by PetroCanada, of Calgary, including HT 60, HT 70, HT 100, and HT 160, are also contemplated. These are fluids having about 0.2% aromatic constituents.

B. Acylating Agents for use in the Preparation of Graftable Monomers

In this specification, the terms olefinic unsaturation and ethylenic unsaturation are used interchangeably. The acylating agent has at least one point of olefinic unsaturation (in other words, C=C) in its structure. Usually, the point of olefinic unsaturation will correspond to —HC=CH— or —HC=CH$_2$. Acylating agents where the point of olefinic unsaturation is α, β to a carboxy functional group are very useful. Olefinically unsaturated mono-, di-, and polycarboxylic acids, the lower alkyl esters thereof, the halides thereof, and the anhydrides thereof represent typical acylating agents in accordance with the present invention. Preferably, the olefinically unsaturated acylating agent is a mono- or dibasic acid, or a derivative thereof such as anhydrides, lower alkyl esters, halides and mixtures of two or more such derivatives. "Lower alkyl" means alkyl groups of one to seven carbon atoms.

The acylating agent may include at least one member selected from the group consisting of monounsaturated $C_4$ to $C_{50}$, alternatively $C_4$ to $C_{20}$, alternatively $C_4$ to $C_{10}$, dicarboxylic acids monounsaturated $C_3$ to $C_{50}$, alternatively $C_3$ to $C_{20}$, alternatively $C_3$ to $C_{10}$, monocarboxylic acids and anhydrides thereof (that is, anhydrides of those carboxylic acids or of those monocarboxylic acids), and combinations of any of the foregoing (that is, two or more of those acids and/or anhydrides).

Suitable acylating agents include acrylic acid, crotonic acid, methacrylic acid, maleic acid, maleic anhydride, fumaric acid, itaconic acid, itaconic anhydride, citraconic acid, citraconic anhydride, mesaconic acid, glutaconic acid, chloromaleic acid, aconitic acid, methylcrotonic acid, sorbic acid, 3-hexenoic acid, 10-decenoic acid, 2-pentene-1,3,5-tricarboxylic acid, cinnamic acid, and lower alkyl (e.g., $C_1$ to $C_4$ alkyl) acid esters of the foregoing, e.g., methyl maleate, ethyl fumarate, methyl fumarate, etc. Particularly preferred are the unsaturated dicarboxylic acids and their derivatives; especially maleic acid, fumaric acid and maleic anhydride.

C. Amines for use in the Preparation of Graftable Monomers

The amines must be capable of being acylated by the appropriate acylating agent, namely primary or secondary amines. Amines capable of being acylated are disclosed in U.S. Pat. No. 4,320,019, column 4, line 60 to column 6, line 14; U.S. Pat. No. 5,424,367, column 10, line 61 to column 13, line 18; U.S. Pat. No. 5,427,702, column 13, line 5 to column 17, line 32. Each of these disclosures is hereby incorporated by reference herein.

Among the various amine types useful in the practice of this invention are alkylene amines, alkylene polyamines, aromatic amines, and polyoxyalkylene polyamines.

Some examples of the alkylene amines and alkylene polyamines include methyleneamines, ethyleneamines, butyleneamines, propyleneamines, pentyleneamines, hexyleneamines, heptyleneamines, octyleneamines, other polymethyleneamines, the cyclic and higher homologs of these amines such as the piperazines, the amino-alkyl-substituted piperazines, etc. These amines include, for example, ethylene diamine, diethylene triamine, triethylene tetramine, propylene diamine, di(heptamethylene)triamine, tripropylene tetramine, tetraethylene pentamine, trimethylene diamine, pentaethylene hexamine, di(trimethylene)triamine, as well as other polyaminic materials. Other higher homologs obtained by condensing two or more of the above-mentioned alkyleneamines may be used.

Examples of suitable polyoxyalkylene polyamines are those which have the formulae.

(i) $NH_2$(-alkylene-O-alkylene)$_m$$NH_2$ where m has a value of about 3 to 70 and preferably 10 to 35; and (ii) R-(alkylene(-O-alkylene)$_n$$NH_2$)$_{3-6}$ where n has a value of about 1 to 40 with the provision that the sum of all the n's is from about 3 to about 70 and preferably from about 6 to about 35 and R is a polyvalent saturated hydrocarbon radical of up to ten carbon atoms. The alkylene groups in either formula (i) or (ii) may be straight or branched chains containing about 2 to 7, and preferably about 2 to 4 carbon atoms.

The polyoxyalkylene polyamines, such as polyoxyalkylene diamines and polyoxyalkylene triamines, may have average molecular weights ranging from about 200 to about 4000 and preferably from about 400 to about 2000. Suitable polyoxyalkylene polyamines include the polyoxyethylene and polyoxypropylene diamines and the polyoxypropylene triamines having average molecular weights ranging from about 200 to 2000.

Other amine types useful in the practice of this invention include amino-aromatic compounds such as N-arylphenylenediamines represented by the formula:

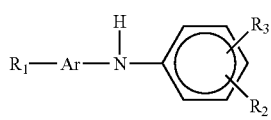

in which Ar is aromatic and $R_1$ is hydrogen, —NH-aryl, —NH-arylalkyl, —NH-alkylaryl, or a branched or straight chain radical having from 4 to 24 carbon atoms and the radical can be an alkyl, alkenyl, alkoxyl, arylalkyl, alkylaryl, hydroxyalkyl or aminoalkyl radical, $R_2$ is —$NH_2$, —(NH($CH_2$)$_n$—)$_m$—$NH_2$, $CH_2$—($CH_2$)$_n$—$NH_2$, -aryl-$NH_2$, in which n and m has a value from 1 to 10, and $R_3$ is hydrogen or an alkyl, alkenyl, alkoxyl, arylalkyl, or alkylaryl radical, which may have from 4 to 24 carbon atoms.

Suitable N-arylphenylenediamine compounds may also be represented by the formula:

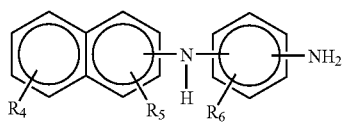

in which $R_4$, $R_5$ and $R_6$ are hydrogen or a linear or branched hydrocarbon radical containing from 1 to 10 carbon atoms and that radical may be an alkyl, alkenyl, alkoxyl, alkylaryl, arylalkyl, hydroxyalkyl, or aminoalkyl radical, and $R_4$, $R_5$ and $R_6$ can be the same or different.

Particularly preferred N-arylphenylenediamines are the N-phenylphenylenediamines, for example, N-phenyl-1,4-phenylenediamine (also referred to herein as 4-aminodiphenylamine), N-phenyl-1,3-phenylenediamine, N-phenyl-1,2-phenylenediamine, N-naphthyl-phenylenediamine, N-phenylnaphthalenediamine and N'-aminopropyl-N-phenylphenylenediamine. Most preferably, the amine is 4-aminodiphenylamine (also called N-phenyl-1,4-phenylenediamine).

Other useful amine types include aminocarbazoles such as those represented by the formula:

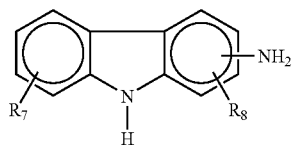

in which $R_7$ and $R_8$ represent hydrogen or an alkyl, alkenyl, or alkoxyl radical having from 1 to 14 carbon atoms, and $R_7$ and $R_8$ can be the same or different;

aminoindoles such as those represented by the formula:

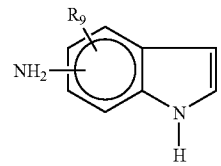

in which $R_9$ represents hydrogen or an alkyl radical having from 1 to 14 carbon atoms, amino-indazolinones such as those represented by the formula:

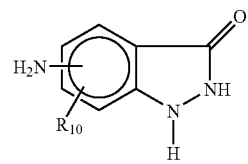

in which $R_{10}$ is hydrogen or an alkyl radical having from 1 to 14 carbon atoms, aminomercaptotriazole as represented by the formula:

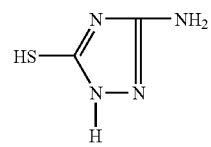

aminoperimidines such as those represented by the formula:

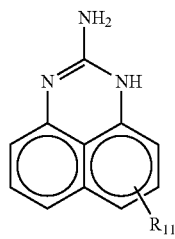

in which $R_{11}$ represents hydrogen or an alkyl or alkoxyl radical having from 1 to 14 carbon atoms.

Other useful amines include: 2-heptyl-3-(2-aminopropyl) imidazoline, 4-methylimidazoline, 1,3-bis-(2-aminoethyl) imidazoline, (2-aminopropyl)-piperazine, 1,4-bis-(2-aminoethyl)piperazine, N,N-dimethyaminopropyl amine, N,N-dioctylethyl amine, N-octyl-N'-methylethylene diamine, and 2-methyl-1-(2-aminobutyl) piperazine, and aminothiazoles from the group consisting of aminothiazole, aminobenzothiazole, aminobenzothiadiazole and aminoalkylthiazole.

It is also contemplated that combinations of the above amines may be used to react with one or more acylating agents.

The choice of amine compound will depend, in part, upon the nature of the acylating agent. In the case of the preferred acylating agent, maleic anhydride, those that will react advantageously with the anhydride functionality are most preferred and, therefore, appropriate. Primary amines are preferred because of the stability of the imide products formed. Primary amines, structurally described as $RNH_2$, may be used in which the R group may contain performance enhancing functionalities desirable for the final product. Such properties may include, among others, wear protection, friction reduction and protection against oxidation. Incorporation of elements in addition to carbon, hydrogen and nitrogen, such as, but not limited to, the halogens or sulfur or oxygen, either alone or in combination, is also contemplated.

D. Method of Preparation of Graftable Monomers

A novel method is provided herein of making an ethylenically unsaturated, aliphatic or aromatic, nitrogen- and oxygen-containing, graftable monomer, suitable for grafting to a polyolefin to form a dispersant viscosity index improver. The method comprises the step of forming an acylating agent mixture comprising a solvent and an acylating agent having at least one point of olefinic unsaturation. The acylating agent may be dissolved or dispersed in the solvent, and the acylating agent mixture may be a solution or a dispersion. Suitable solvents include oxygenates such as acetone, base oils, and amides such as N,N-dimethyl formamide. The method also comprises the step of adding an amine to the acylating agent mixture, thereby forming a mixture. The amine may be added to the acylating agent all at once or slowly, for example, by adding aliquots or metering over a period of time. "Metering" means to add, by drops or continuously, a specific amount over a certain time. The method may comprise the simultaneous metering of the acylating agent and the amine into the solvent or premixing the acylating agent and the amine prior to mixing the reactants with solvent. The method also comprises the step of heating the mixture. The acylating agent and/or the amine may be heated before, during or after they are combined. The method forms a reaction product of the acylating agent and the amine. The monomer may or may not be recovered from the reaction product before carrying out the grafting reaction. The present methods may also comprise the step of recovering one or more graftable components from the reaction product of the acylating agent and the amine.

The acylating agent and the amine may be provided in suitable weight ratios, though such ratios are not critical for all aspects of the invention. Suitable weight ratios of amine to acylating agent include, but are not limited to, the ranges of from about 0.1:1 to about 2:1, from about 0.1:1 to about 6:1, from about 0.2:1 to about 6:1, from about 0.3:1 or 0.6:1 to about 2:1, and from about 1:1 to about 4:1. Where the acylating agent is maleic acid, preferred weight ratios are in the range of from about 0.6:1 to about 2:1. Where the acylating agent is maleic anhydride, preferred weight ratios are in the range of from about 0.3:1 to about 2:1.

II. Materials and Methods for Preparation of Graft Copolymers

A. Polyolefins for use in the Preparation of Graft Copolymers

A wide variety of polyolefins (which may or may not have pendant unsaturation) are contemplated for use as a backbone for grafting. Examples of polyolefins contemplated for use include olefin homopolymers, copolymers, and terpolymers, such as, but not limited to, polyethylene, polypropylene, ethylene-propylene copolymers, polymers containing two or more monomers, polyisobutene, polymethacrylates, polyalkylstyrenes, partially hydrogenated polyolefins of butadiene and styrene and copolymers of isoprene, such as polymers of styrene and isoprene. EPDM (ethylene/propylene/diene monomer) polymers, ethylene-propylene octene terpolymers and ethylene-propylene ENB terpolymers, are also contemplated for use.

Materials contemplated for use herein include ethylene/propylene/diene polyolefins containing from about 15% to about 90% ethylene and from about 10% to about 85% propylene moieties by number, or alternatively, from 30% to about 75% ethylene and from about 25% to about 70% propylene moieties by number. These materials may be optionally modified with from 0% to about 9% diene monomers. Useful diene monomers include 1,4-hexadiene, dicyclopentadiene, 2,5-norbornadiene, 5-ethylidene-2-norbornene, and 1-allyl-4-isopropylidene cyclohexane and combinations of two or more diene monomers. Polyolefins contemplated for use include by reference those suggested in U.S. Pat. Nos. 4,092,255, 4,640,788, 5,219,480, 5,298,565 and 6,410,652. The polyolefins contemplated herein may have weight average molecular weights of from about 10,000, alternatively from about 20,000 to about 500,000.

Specific materials which are contemplated for use herein include olefin copolymers of principally ethylene, and propylene with termonomers such as, but not limited to, octene and ENB marketed by DuPont Dow Elastomers, Wilmington, Del.; VISNEX polyolefins, comprised of ethylene, propylene, and ENB sold by Mitsui Petrochemical Industries, Ltd., Tokyo, Japan; VISTALON ethylene-propylene polyolefins, sold by ExxonMobil Chemical, Houston, Tex.; also the family of PARATONE polyolefins comprised primarily of ethylene and propylene, marketed by Chevron Oronite Company, L.L.C., headquartered in Houston, Tex.; styrene/butadiene, hydrogenated isoprene copolymers and styrene/isoprene marketed by Infineum International, Ltd., Abingdon, UK or Infineum USA LP, Linden, N.J., such as SV-50, SV-200, SV-250 and SV-300 also olefin copolymers based on ethylene and propylene marketed by Infineum International, Ltd., Abingdon, UK or Infineum USA LP, Linden, N.J.; elastomers available from DSM Copolymer are also contemplated, as are polymers marketed under the DUTRAL name by Polimeri Europa, of Ferrara, Italy such as CO-029, CO-034, CO-043, CO-058, TER 4028 and TER 4044. The Uniroyal line of polymers marketed by Crompton Corporation of Middlebury, Conn. under the ROYALENE name such as 400, 501, 505, 525, 535, 563 and 580 HT are also contemplated. Combinations of the above materials, and other, similar materials, are also contemplated.

B. Initiators for use in the Preparation of Graft Copolymers

Broadly, any free-radical initiator capable of operating under the conditions of the reactions as outlined in the present specification is contemplated for use herein. Representative initiators are disclosed in U.S. Pat. No. 4,146,489, column 4, lines 45-53, which is incorporated here by reference. Specific "peroxy" initiators contemplated herein include alkyl, dialkyl, and aryl peroxides, for example: di-t-butyl peroxide (abbreviated herein as "DTBP"), dicumyl peroxide, t-butyl cumyl peroxide, benzoyl peroxide, 2,5-dimethyl-2,5-di(t-butylperoxy)hexane, and 2,5-dimethyl-2,5-di(t-butylperoxy)hexyne-3. Also contemplated are peroxyester and peroxyketal initiators, for example: t-butylperoxy benzoate, t-amylperoxy benzoate, t-butylperoxy acetate, t-butylperoxy benzoate, di-t-butyl diperoxyphthalate, and t-butylperoxy isobutyrate. Also contemplated are hydroperoxides, for example: cumene hydroperoxide, t-butyl hydroperoxide, and hydrogen peroxide. Also contemplated are azo initiators, for example: 2-t-butylazo-2-cyanopropane, 2-t-butylazo-1-cyanocyclohexane, 2,2'-azo-bis(2,4-dimethylpentane nitrile), 2,2'-azobis(2-methylpropane nitrile), 1,1'-azobis (cyclohexanecarbonitrile), and azoisobutyronitrile (AIBN). Other similar materials are also contemplated such as, but not limited to, diacyl peroxides, ketone peroxides and peroxydicarbonates. It is also contemplated that combinations of more than one initiator, including combinations of different types of initiators, may be employed.

Each such initiator commonly has a characteristic minimum reaction initiation temperature, above which it will readily initiate a reaction and below which the reaction will proceed more slowly or not at all. Consequently, the minimum reaction temperature is commonly dictated by the selected initiator.

C. Solvents for use in the Preparation of Graft Copolymers

Useful solvents include volatile solvents which are readily removable from the grafted polyolefin after the reaction is complete or ones which are not readily volatilized and removed after completion of the reaction. Any solvent may be used which can disperse or dissolve the components of the reaction mixture which include monomer, monomer components or precursors and polyolefin and which will not participate appreciably in the reaction or cause side reactions to a material degree. Several examples of solvents of this type include straight chain or branched aliphatic or alicyclic hydrocarbons, such as n-pentane, n-heptane, i-heptane, n-octane, i-octane, nonane, decane, cyclohexane, dihydronaphthalene, decahydronaphthalene and others. Aliphatic ketones, ethers, esters, etc., which are suitable for dissolving or dispersing the polymer are also contemplated as solvents herein. Nonreactive halogenated aromatic hydrocarbons such as chlorobenzene, dichlorobenzene, trichlorobenzene, dichlorotoluene and others are also useful as solvents. Also contemplated are mixtures of solvents.

The solvents useful here also include base oils which may be suitable for incorporation into a final lubricating oil product. Any base oil may be used which can disperse or dissolve the reactants without materially participating in the reaction or causing side reactions to an unacceptable degree. For example, solvent dewaxed and hydrocracked base oils, paraffin and isoparaffin fluids, base oils which contain low or moderate levels of aromatic constituents, and fluid poly-α-olefins are contemplated for use herein. The use of base stocks having aromatic constituents, while being less than optimum in some instances, is contemplated under this disclosure.

In this specification, the "level of aromatic constituents" is defined as the weight percentage of molecular species containing aromatic carbon atoms. The petroleum oil solvents contemplated here are those containing less than about 50% by weight of molecular aromatic impurities, alternatively less than about 30% by weight of molecular aromatic impurities, alternatively less than about 20% by weight of such impurities, alternatively less than about 15% by weight of such impurities, alternatively less than about 10% by weight of such impurities, alternatively less than about 5% by weight of such impurities, alternatively less than about 1% of such impurities, alternatively about 0.3% or less of such impurities.

Examples of suitable solvent base oils are as follows.

The higher aromatic fluids contemplated for the present use have aromatic contents of from about 15 wt % to about 35 wt %. Suitable oils of this kind include, for example, 100 SUS, 130 SUS, or 150 SUS low pour solvent neutral base oils, sold as lubricant base oils by ExxonMobil Corporation.

Fluids having intermediate concentrations of aromatics for use in the present application include ones ranging from about 10 wt % to 15 wt % aromatics. Contemplated for use as fluids with intermediate concentrations of aromatics are blends of fluids having high and low aromatics concentrations as well as directly manufactured fluids having intermediate concentrations of aromatics.

Base oils with somewhat lower concentrations of aromatics contemplated for the present use include the following materials: CHEVRON NEUTRAL OIL 100R, sold by ChevronTexaco; moderately high aromatic content oils such as naphthenic oil, for which the aromatic content is about 5-12 wt %; blends of any of the individual oils named in this specification; and others.

The minimally aromatic fluids contemplated for use in the present context include hydrotreated oils having from about 0.1 to about 5 wt % aromatic content. Representative minimally aromatic fluids include PetroCanada HT 60 (P 60 N), HT 70 (P 70 N), HT 100 (P 100 N), and HT 160 (P 160 N) straight cut or blended oil stocks having about 0.2% aromatic constituents, sold for use in lubricating oils by PetroCanada, Calgary, Alberta; RLOP (derived from "Richmond Lube Oil Plant") 100 N or 240 N straight or blended low aromatic content hydrotreated oil stocks, containing about 0.5% aromatic constituents, sold by ChevronTexaco; and low aromatic content stocks marketed by both ExxonMobil Corporation of Fairfax, Va. and Motiva Enterprises LLC. In general, Group I, Group II, Group III, Group IV and Group V base stock categories are contemplated for use.

Aromatic-free process fluids can also be used to carry out the present invention. Several examples of process fluids containing no measurable aromatic constituents include synthetic poly-alpha-olefin ("PAO") base stocks and highly refined paraffinic and isoparaffinic fluids.

The preferable range of aromatic content in the process fluid is about 0-15 wt %, alternatively about 0-10 wt %. The most preferable range is about 0-5 wt %.

D. Inhibitors

Inhibitors may optionally be used in the present grafting reaction to limit the degree of crosslinking of the polyolefin. The inventors contemplate that limiting the amount of crosslinking will reduce the viscosity increase resulting from the grafting reaction and provide a final grafted polyolefin which has improved shear stability.

One category of inhibitors contemplated herein is that of hindered phenols, which are commonly used as antioxidants or free radical inhibitors. One representative hindered phenol for this purpose is octadecyl-3,5-di-t-butyl-4-hydroxyhydrocinnamate. Another representative inhibitor is hydroquinone.

E. Solution Reaction Methods for Preparation of Graft Copolymer

The present reaction can be carried out as follows. The polyolefin to be grafted is first dissolved in a process fluid at a polymer solids concentration ranging from about 1% to about 25%, for example, about 12.5%. In order to dissolve the polyolefin, the polyolefin is granulated and then dissolved in an appropriate reaction solvent. This solvent may be a typical lubricant base oil or any other suitable solvent. This dissolution step is generally carried out under an inert gas blanket, or with an inert gas purge, at a temperature lower than the reaction temperature. Typically dissolution is carried out at temperatures from 60° C. to about 120° C., for example, about 100° C. The dissolution temperature will normally be less than the reaction temperature. Holding the mixture at a higher temperature may degrade the components. Both the initiator and the monomer may also be blended with appropriate solvents. The initiator concentration, in its blend, ranges from about 1 wt % to 100 wt % and the monomer concentration, in its blend, also ranges from about 1 wt % to 100 wt %. For example, the initiator and monomer blend concentrations may be 3 wt % and 30 wt % respectively.

The polymer solution is transferred to a suitable reactor which can be purged or blanketed with an inert gas for example, nitrogen, carbon dioxide, helium, or argon or otherwise isolated from ambient oxygen gas as required. A heated batch reactor is suitable.

The polyolefin solution is heated to the desired reaction temperature, chosen so that essentially all of the initiator is consumed during the time allotted for the reaction. For example, if DTBP (di-t-butyl peroxide) is used as the initiator, the reaction temperature should be greater than about 160° C., alternatively greater than about 165° C., alternatively greater than about 170° C., alternatively greater than about 175° C., alternatively about 170° C., alternatively about 175° C., alternatively less than about 175° C., alternatively less than about 180° C., alternatively less than about 185° C., alternatively less than about 190° C., alternatively less than about 195° C., alternatively less than about 200° C.

Since the various acceptable initiators have different optimum reaction temperatures, the choice of a particular initiator may require adjustment of the reaction temperature or the reaction time in order that the reaction conditions be compatible with the choice of initiator.

1. Molar Proportion of Monomer

The contemplated proportions of the graftable monomer to the polyolefin and reaction conditions are selected so that an effective percentage (ideally, most or all of the reactant charge) of the graftable monomer will graft directly onto the polyolefin, rather than forming dimeric, oligomeric, or homopolymeric graft moieties or entirely independent homopolymers. The alternatively contemplated minimum mole ratios of the graftable monomer to the starting polyolefin are as follows:

at least about 1 mole,
alternatively at least about 2 moles,
alternatively at least about 3 moles,
alternatively at least about 4 moles,
alternatively at least about 5 moles,
alternatively at least about 6 moles,
alternatively at least about 7 moles,
alternatively at least about 8 moles,
alternatively at least about 9 moles,
alternatively at least about 10 moles,
alternatively at least about 11 moles,
alternatively at least about 12 moles,
alternatively at least about 13 moles,
alternatively at least about 14 moles,
alternatively at least about 15 moles,
alternatively at least about 16 moles,
alternatively at least about 17 moles,
alternatively at least about 18 moles,
alternatively at least about 19 moles,
alternatively at least about 20 moles,
alternatively at least about 22 moles,
alternatively at least about 24 moles,
alternatively at least about 26 moles,
alternatively at least about 28 moles,
alternatively at least about 30 moles,
alternatively at least about 40 moles,
alternatively at least about 50 moles,
alternatively at least about 60 moles,
alternatively at least about 70 moles,
alternatively at least about 80 moles,
alternatively at least about 100 moles,
alternatively at least about 120 moles, of the graftable monomer per mole of the starting polyolefin. The contemplated maximum molar proportions of the graftable monomer to the starting polyolefin are as follows:

at most about 20 moles,
alternatively at most about 22 moles,
alternatively at most about 24 moles,
alternatively at most about 26 moles,
alternatively at most about 28 moles,
alternatively at most about 30 moles,
alternatively at most about 40 moles,
alternatively at most about 50 moles,
alternatively at most about 60 moles,
alternatively at most about 70 moles,
alternatively at most about 80 moles,
alternatively at most about 100 moles,
alternatively at most about 110 moles,
alternatively at most about 120 moles, or more of the graftable monomer per mole of the starting polyolefin.

A contemplated maximum molar proportion of the graftable monomer to the starting polyolefin may be desirable in several situations. For example, it may be preferable to select a contemplated maximum molar proportion of the graftable monomer to the starting polyolefin in order to facilitate manufacturing control product quality. For example, molar proportions in excess of about 25:1, may result in the formation of insolubles or gels which may, under certain conditions, slow manufacturing and impair product quality. Thus, it may be preferable to employ a contemplated maximum molar ratio of the graftable monomer to the starting polyolefin of at most about 20 moles, alternatively at most about 22 moles, alternatively at most about 24 moles, alternatively at most about 25 mole (when it is expected that 100% of the monomer grafts to the polymer). One of ordinary skill in the art will recognize that higher maximum molar proportions may be desirable when other circumstances are involved. For example, to generate efficacious product, it may be desirable to prepare a graft reaction product having a molar proportion of grafted monomer to the polymer of at most about 30:1, alternatively at most about 40:1 or another suitable maximum disclosed herein.

The graftable monomer may be introduced into the reactor all at once, in several discrete charges, or at a steady rate over an extended period. The desired minimum rate of addition of the graftable monomer to the reaction mixture is selected from:

at least about 0.1%,
alternatively at least about 0.5%,
alternatively at least about 1.0%,
alternatively at least about 1.2%,
alternatively at least about 1.4%,
alternatively at least about 1.6%,
alternatively at least about 1.8%,
alternatively at least about 2.0%,
alternatively at least about 2.2%,
alternatively at least about 2.4%,
alternatively at least about 2.6%,
alternatively at least about 2.8%,
alternatively at least about 3.0%,
alternatively at least about 3.2%,
alternatively at least about 3.4%,
alternatively at least about 3.6%,
alternatively at least about 3.8%,
alternatively at least about 4.0%,
alternatively at least about 4.5%,
alternatively at least about 5.0%,
alternatively at least about 20%,
alternatively at least about 50%,
alternatively at least about 100%,
of the necessary charge of graftable monomer per minute. When added over time, the monomer can be added at an essentially constant rate, or at a rate which varies with time. Any of the above values can represent an average rate of addition or the minimum value of a rate which varies with time.

The desired maximum rate of addition is selected from:
at most about 0.1%,
alternatively at most about 0.5%,
alternatively at most about 1.0%,
alternatively at most about 1.2%,
alternatively at most about 1.4%,
alternatively at most about 1.6%,
alternatively at most about 1.8%,
alternatively at most about 2.0%,
alternatively at most about 2.2%,
alternatively at most about 2.4%,
alternatively at most about 2.6%,
alternatively at most about 2.8%,
alternatively at most about 3.0%,
alternatively at most about 3.2%,
alternatively at most about 3.4%,
alternatively at most about 3.6%,
alternatively at most about 3.8%,
alternatively at most about 4.0%,
alternatively at most about 4.5%,
alternatively at most about 5.0%,
alternatively at most about 20%,
alternatively at most about 100%
of the necessary charge of graftable monomer per minute. Any of the above values can represent an average rate of addition or the maximum value of a rate which varies with time.

The graftable monomer may be added as a neat liquid, in solid or molten form, or cut back with a solvent. While it may be introduced neat, it is preferably cut back with a solvent to avoid high localized concentrations of the monomer as it enters the reactor. In a preferred embodiment, it is substantially diluted with the process fluid (reaction solvent). The monomer can be diluted by at least about 5 times, alternatively at least about 10 times, alternatively at least about 20 times, alternatively at least about 50 times, alternatively at least about 100 times its weight or volume with a suitable solvent or dispersing medium.

2. Molar Proportion of Initiator

The contemplated proportions of the initiator to the graftable monomer and the reaction conditions are selected so that at least many, and ideally, all of the monomer will graft directly onto the polyolefin, rather than forming dimeric, oligomeric, or homopolymeric graft moieties or entirely independent homopolymers. The contemplated minimum molar proportions of the initiator to the graftable monomer are from about 0.05:1 to about 2:1. No specific maximum proportion of the initiator is contemplated, though too much of the initiator may degrade the polyolefin, cause problems in the finished formulation and increase cost and, therefore, should be avoided.

While the initiator may be added neat, in a preferred embodiment, it is introduced "cut-back" with solvent in order to avoid localized regions of elevated concentration. The initiator can be added before, with or after the graftable monomer. For example, the initiator may be added so that, at any given time, the amount of unreacted initiator present is much less than the entire charge, and preferably a small fraction of the entire charge. In one embodiment, the initiator may be added after substantially all the graftable monomer has been added, so there is an excess of both the graftable monomer and the polyolefin during essentially the entire reaction. In another embodiment, the initiator may be added along with the graftable monomer, either at essentially the same rate (measured as a percentage of the entire charge added per minute) or at a somewhat faster or slower rate, so there is an excess of polyolefin to unreacted initiator and unreacted monomer. For this embodiment, the ratio of unreacted initiator to unreacted monomer remains substantially constant during most of the reaction.

3. Rate of Addition of Initiator

The initiator may be introduced into the reactor in several (or, alternatively, many) discrete charges, or at a steady rate over an extended period. The desired minimum rate of addition of the initiator to the reaction mixture is selected from:

at least about 0.1%,
alternatively at least about 0.5%,
alternatively at least about 1.0%,
alternatively at least about 1.2%,
alternatively at least about 1.4%,
alternatively at least about 1.6%,
alternatively at least about 1.8%,
alternatively at least about 2.0%,
alternatively at least about 2.2%,
alternatively at least about 2.4%,
alternatively at least about 2.6%,
alternatively at least about 2.8%,
alternatively at least about 3.0%,
alternatively at least about 3.2%, alternatively at least about 3.4%,
alternatively at least about 3.6%,
alternatively at least about 3.8%,
alternatively at least about 4.0%,
alternatively at least about 4.5%,
alternatively at least about 5.0%,
alternatively at least about 20%
alternatively at least about 50%,
alternatively at least about 100%, of the necessary charge of initiator per minute. The initiator can be added at an essentially constant rate, or at a rate which varies with time. Any of the above values can represent an average rate of addition or the minimum value of a rate which varies with time.

The desired maximum rate of addition of the initiator to the reaction mixture is selected from:
at most about 0.1%,
alternatively at most about 0.5%,
alternatively at most about 1.0%,
alternatively at most about 1.2%,
alternatively at most about 1.4%,
alternatively at most about 1.6%,
alternatively at most about 1.8%,
alternatively at most about 2.0%,
alternatively at most about 2.2%,
alternatively at most about 2.4%,
alternatively at most about 2.6%,
alternatively at most about 2.8%,
alternatively at most about 3.0%,
alternatively at most about 3.2%,
alternatively at most about 3.4%,
alternatively at most about 3.6%,
alternatively at most about 3.8%,
alternatively at most about 4.0%,
alternatively at most about 4.5%,
alternatively at most about 5.0%,
alternatively at most about 10%,
alternatively at most about 20%,
alternatively at most about 40%,
alternatively at most about 50%,
alternatively at most about 100% of the necessary charge of initiator per minute. Any of the above values can represent an average rate of addition or the maximum value of a rate which varies with time.

While the initiator can be added neat, it is preferably cut back with a solvent to avoid high localized concentrations of the initiator as it enters the reactor. In a preferred embodiment, it is substantially diluted with the process fluid (reaction solvent). The initiator can be diluted by at least about 5 times, alternatively at least about 10 times, alternatively at least about 20 times, alternatively at least about 50 times, alternatively at least about 100 times its weight or volume with a suitable solvent or dispersing medium.

If a polymerization inhibitor is to be used, the inventors contemplate that it may be added after the other ingredients have been added. The inhibitor may constitute from 0 to about 1 weight percent of the reaction mixture, alternatively from about 0.01 wt % to about 0.5 wt % of the reaction mixture, alternatively 0.05 wt % to 0.10 wt % of the reaction mixture. It may be added immediately, after the other reactants or after a time delay. The inhibitor may be added all at once or over a time interval.

4. Procedure for Grafting Reactor

After the reactants and the inhibitor (if any) have been added, the reaction mixture is preferably mixed with heating for an additional 2 to 120 minutes to complete the reaction.

The time required for completion of the reaction can be determined experimentally, by determining when the proportion of nitrogen, or of the grafted monomer in solution, reaches a value at or approaching a minimum pre-established value, or when the viscosity approaches a near constant value.

After the reaction has gone essentially to completion, the heat can be removed and the reaction product can be allowed to cool in the reactor with mixing. Alternatively, more aggressive cooling can be employed, using a heat exchanger or other apparatus. Alternatively, the reaction product may be removed while still at or near reaction temperature.

F. Melt Reaction Conditions for Preparation of Graft Polyolefin

Alternatively, the grafting reaction can be carried out under polymer melt reaction conditions in an extrusion reactor, a heated melt-blend reactor, a Banbury mill or other high-viscosity-material blenders or mixers, for example, an extruder. (Where an extruder is referred to in this disclosure, it should be understood that this is exemplary of the broader class of blenders or mixers which may be used for melt-blending according to the present invention.)

To carry out the melt reaction, it is desirable to establish suitable extruder operating conditions for generating grafted polymeric product having an effective percentage of or most or all of the monomer grafted on the polymer. The monomer should be grafted directly onto the polyolefin, rather than forming dimeric, oligomeric, or homopolymeric graft moieties or, forming independent homopolymers.

One may generate graft copolymer exhibiting the desired qualities and performance characteristics by selecting, based on the teachings of the present specification, appropriate reactant feed rates as well as appropriate extruder operating conditions. These conditions include, among others, the proportions of the graftable monomer to the polyolefin and of the initiator to polymer or, alternatively, of the initiator to monomer as well as the design of the extruder and its operating conditions. The latter include, but are not limited to, the screw design and its size, barrel diameter and length, die configuration and open cross-section, barrel temperature, die temperature, screw speed, pre-extrusion and post-extrusion conditions, the reactant feed systems, the polymer feed hopper and the reactant addition ports.

With respect to the reactants, the contemplated minimum molar proportions are generally the same as that previously stated in the discussion of the solvent based reaction. As outlined for the solvent based reaction, the reactants may be fed to the extruder, alternatively, as a mixture of components or separately, as individual components. In the preferred embodiment, the reactants, for example monomer and initiator, are fed separately. It is also preferred to feed the polymer as the first reactant.

The reactants are fed to a suitable polyolefin extruder or other melt-blend reactor. The operating conditions for the extruder and the design of the extruder, in terms of screw design and size, barrel diameter and length, die configuration and open cross-section, barrel temperature, die temperature, screw speed, pre-extrusion and postextrusion conditions, the reactant feed systems, the polymer feed hopper and reactant addition ports, may be selected using routine skill in the extrusion field, to yield product with the desired qualities and performance characteristics. During operation, the extruder can be maintained under essentially aerobic conditions, or may be purged or blanketed with an inerting material, for example, nitrogen, carbon dioxide, or argon, in order to create anaerobic operating conditions.

To carry out the melt reaction, the polyolefin feed must be brought to its melt condition. Heating of the polymer may be achieved, among others, by using an external heat source preceding the extruder, by heating the extruder, alternatively, by means of the friction resulting from mastication and flow of the polyolefin composition in the extruder, or by any combination of these expedients. The other reactants can be heated to the desired reaction temperature either before or while they are fed to the extruder or while in the extruder. Since the temperature of the polyolefin will, in part, determine the temperature of the other reactants, the polyolefin may be brought to near the desired reaction temperature, the temperature chosen so that essentially all of the initiator is consumed during the time allotted for the reaction.

The graftable monomer is metered into the extruder at a constant rate throughout the reaction through one or several discrete monomer feed ports. The monomer may be fed either with or after the polyolefin, that is, either into the same extruder zone, or the addition of the monomer may be somewhat delayed, by being introduced downstream from the polymer, or into a zone separated from the polymer feed hopper by an appropriate seal. The rate of addition of the graftable monomer or its concentration relative to polymer is adjusted to yield the desired monomer to polymer ratio in the final product.

While the monomer may be added neat, in a preferred embodiment, it is introduced "cut-back" with solvent in order to avoid localized regions of elevated concentration. Representative solvents include base oils conventionally used in lubricant compositions, as defined in this specification, mineral spirits, volatile solvents, polar solvents and other solvents known to those skilled in the art. The concentration of monomer relative to solvent ranges from about 1 wt % to about 100 wt %. The cut-back solvent can be used in essentially the same proportions, with respect to the amount of monomer, as noted for the solvent reaction.

Similarly, the initiator may be metered into the extruder at a constant rate throughout the reaction through one or several discrete initiator feed ports. The initiator may be fed either before, with, or after the monomer, that is, either into the same extruder zone or into a zone separated from the monomer feed by an appropriate seal. The rate of addition of the initiator, or its concentration relative to monomer, is adjusted to yield the desired monomer to polymer ratio in the final product while maintaining satisfactory physical and performance properties. While the monomer may be added neat, in a preferred embodiment, it is introduced "cut-back" with solvent in order to avoid localized regions of elevated concentration.

In some embodiments, the initiator may be added in a fashion so that there is a large excess of both the graftable monomer and the polyolefin present during essentially the entire reaction. In other embodiments, the initiator may be added along with the graftable monomer, either at the same rate or a somewhat faster or slower rate, so there is an excess of polyolefin to unreacted initiator, so the amount of unreacted graftable monomer is comparable to the amount of unreacted initiator.

In one embodiment, the initiator is added through a feed port downstream from that through which the graftable monomer has been added. In another embodiment, the initiator may be added along with the graftable monomer, either at the same rate (measured as a percentage of the rate of addition of the polyolefin) or at a somewhat faster or slower rate. Once operational equilibrium for the extruder has been established, the ratios of monomer to polyolefin and of initiator to monomer remain essentially fixed and the reactant flow rates remain essentially constant during its operation. Oftentimes, flow rates are chosen so that the concentration of graftable monomer is greater than or comparable to the concentration of unreacted initiator.

The extruder generally operates continuously during which time the ingredients (reactants) are added at a uniform rate. At times it is desirable to introduce the reactants sequentially along the extruder barrel. Such delays in the introduction of reactants can be generated by aligning the reactant feed ports sequentially along the extruder barrel or, alternatively, by introducing "seal" elements into the design of the extruder which serve to physically segment the extruder into distinct zones along the barrel. The reactants may, then, be fed, via the reactant feed ports, into these zones.

In alternate embodiments of this invention, as explained above, the monomer and initiator can be introduced together at the appropriate relative concentration. By carefully selecting the operating conditions, in terms of residence times, extruder zone temperatures, screw speed, reactant feed rates, etc., the extruder process may be customized for various polymers cited herein, any of the graftable monomers covered herein, the initiators cited herein, and, if required, inhibitors, or, alternatively, to yield product having specific monomer to polymer ratios or other specifically desired properties.

In a preferred embodiment of the melt reaction process, the grafted polyolefin product will be cut-back with solvent in order to facilitate handling of the graft polymer and lubricant blending using the graft product.

III. Composition and Materials for Preparation of Lubricating Oil Compositions

A. Composition of Lubricating Oil Compositions

The lubricating oil compositions of the present invention preferably comprise the following ingredients in the stated proportions:

A. from about 70% to about 99% by weight, alternatively from about 80% to about 99% by weight, alternatively from about 88% to about 99% by weight, of one or more base oils (including base oil carried over from the making of the grafted polyolefin);

B. from about 0.05% solids to about 10% solids by weight, alternatively from about 0.05% solids to about 5% solids by weight, alternatively from about 0.15% solids to about 2% solids by weight, alternatively from about 0.15% solids to about 1.5% solids by weight, alternatively from 0.25% solids to about 1.5% solids by weight, alternatively from 0.4% solids by weight to 1.5% solids by weight, alternatively 0.5% solids by weight to 1.5% solids by weight, of one or more of the grafted polyolefins made according to this specification (i.e., not including base oil carried over from the making of the grafted polyolefin);

C. from about 0.0% solids to 2.0% solids by weight, alternatively from about 0.0% solids to about 1.0% solids by weight, alternatively from about 0.05% solids to about 0.7% solids by weight, alternatively from about 0.1% solids to about 0.7% solids by weight, of one or more polyolefins other than the grafted polyolefins according to the present invention;

D. from 0.0% to about 15% by weight, alternatively from about 0.5% to about 10% by weight, alternatively from about 0.5% to about 6% by weight, or alternatively from about 0.7% to about 6%, of one or more dispersants which are not grafted polyolefins according to the present invention;

E. from about 0.3% to 6% by weight, alternatively from about 0.3% to 4% by weight, alternatively from about 0.5% to about 3% by weight, alternatively from about 0.5 to about 2% by weight, of one or more detergents;

F. from about 0.01% to 3% by weight, alternatively from about 0.04% to about 2.5% by weight, alternatively from about 0.06% to about 2% by weight, of one or more anti-wear agents;

G. from about 0.01% to 5% by weight, alternatively from about 0.01% to 2% by weight, alternatively from about 0.05% to about 1.5% by weight, alternatively from about 0.1% to about 1% by weight, of one or more anti-oxidants; and H. from about 0.0% to 4% by weight, alternatively from about 0.0% to 3% by weight, alternatively from about 0.005% to about 2% by weight, alternatively from about 0.005% to about 1.5% by weight, of minor ingredients such as, but not limited to, friction modifiers, pour point depressants, and anti-foam agents.

The percentages of D through H may be calculated based on the form in which they are commercially available. The function and properties of each ingredient identified above and several examples of ingredients are summarized in the following sections of this specification.

B. Base Oils

Any of the petroleum or synthetic base oils previously identified as process solvents for the graftable polyolefins of the present invention can be used as the base oil. Indeed, any conventional lubricating oil, or combinations thereof, may also be used.

C. Composition of Grafted Polyolefins

The grafted polyolefins according to the present invention contain:
at least about 1 mole,
alternatively at least about 2 moles,
alternatively at least about 3 moles,
alternatively at least about 4 moles,
alternatively at least about 5 moles,
alternatively at least about 6 moles,
alternatively at least about 7 moles,
alternatively at least about 8 moles,
alternatively at least about 9 moles,
alternatively at least about 10 moles,
alternatively at least about 11 moles,
alternatively at least about 12 moles,
alternatively at least about 13 moles,
alternatively at least about 14 moles,
alternatively at least about 15 moles,
alternatively at least about 16 moles,
alternatively at least about 17 moles,
alternatively at least about 18 moles,
alternatively at least about 19 moles,
alternatively at least about 20 moles,
alternatively at least about 22 moles,
alternatively at least about 24 moles,
alternatively at least about 26 moles,
alternatively at least about 28 moles,
alternatively at least about 30 moles,
alternatively at least about 32 moles,
alternatively at least about 34 moles,
alternatively at least about 36 moles,
alternatively at least about 38 moles,
alternatively at least about 40 moles,
alternatively at least about 50 moles,
alternatively at least about 60 moles,
alternatively at least about 70 moles,
alternatively at least about 80 moles,
alternatively at least about 90 moles,
alternatively at least about 100 moles,
alternatively at least about 120 moles of grafted monomer per mole of the original polyolefin, and at least about 0.2% by weight,
alternatively at least about 0.3% by weight,
alternatively at least about 0.4% by weight,
alternatively at least about 0.5% by weight,
alternatively at least about 0.6% by weight,
alternatively at least about 0.7% by weight,
alternatively at least about 0.8% by weight,
alternatively at least about 0.9% by weight,
alternatively at least about 1.0% by weight,
alternatively at least about 1.1% by weight,
alternatively at least about 1.2% by weight,
alternatively at least about 1.3% by weight,
alternatively at least about 1.4% by weight,
alternatively at least about 1.5% by weight,
alternatively at least about 1.6% by weight,
alternatively at least about 1.7% by weight,
alternatively at least about 1.8% by weight,
alternatively at least about 1.9% by weight,
alternatively at least about 2.0% by weight,
alternatively at least about 3.0% by weight,
alternatively at least about 4.0% by weight,
alternatively at least about 5.0% by weight,
alternatively at least about 6.0% by weight,
alternatively at least about 7.0% by weight,
alternatively at least about 8.0% by weight,
alternatively at least about 9.0% by weight,
alternatively at least about 10% by weight,
alternatively at least about 12% by weight,
alternatively at least about 20% by weight, of grafted moieties per unit weight of the grafted polyolefin (generally calculated by assuming a 200 dalton molecular weight for the monomer and a 100,000 dalton molecular weight for the polymer).

The molecular weight of the grafted polyolefin will usually be comparable to that of the ungrafted polyolefin from which it is made.

The grafted polyolefins can be used in place of part or all of the viscosity index improving polyolefins conventionally used in such formulations. They can also be used in place of part or all of the dispersants conventionally used in such formulations, as they help keep in suspension the impurities which develop in lubricating oils during use.

The use of the present grafted dispersant polyolefins has many significant formulation advantages. The low-temperature viscosity increase normally caused by the presence of conventional dispersants may be largely eliminated. This allows higher-viscosity and, thus, less volatile base oils to be used. As a result, reduced volatility engine oil formulations, such as 5W-20, 5W-30 and 10W-30, may be formulated. Another advantage of the present invention is that lubricant compositions that use the grafted polyolefin, in general, are much less expensive than lubricant compositions that use conventional dispersants. This means that the formulations of the present invention are more economical than previous lubricant formulations which use less-grafted polyolefins and more of the conventional dispersants.

Moreover, an improvement in wear is achieved when the present invention is used and the amount of the conventional dispersant is reduced. Dispersants, it is believed, both interact with the anti-wear agents and compete with them for sites on the parts being lubricated, thus reducing their effectiveness. The inventors theorize that this interaction reduces the efficacy of the anti-wear agents. See *Exxon Chemical Patents, Inc. v. Lubrizol Corporation*, 64 F.3d 1553 (Fed. Cir. 1995). That opinion is incorporated here by reference.

Grafted polyolefins disclosed in prior art can be used in combination with the grafted polyolefins disclosed in the present invention. Previously known grafted polyolefins, some of which also may displace part of other dispersing agents, include those disclosed in U.S. Pat. No. 4,092,255, column 1, lines 47-53: grafted polyolefins resulting from the grafting of acrylonitrile or aminoalkyl methacrylates on amorphous polyolefins of ethylene and propylene, or also polyolefins obtained by radical polymerization of acrylates or alkyl methacrylates with vinyllactams such as N-vinylpyrrolidinone or aminoalkyl methacrylates.

Other grafted polyolefins useful herein include those disclosed in U.S. Pat. No. 4,092,255 from column 2, line 1, to column 5, line 12, which is hereby incorporated herein by reference. The constituents of those grafted polyolefins (polyolefins, initiators, and graftable monomers) can also be used to prepare the grafted polyolefins according to the present invention.

D. Non-Grafted Polyolefins

The conventional viscosity index improving polyolefins can be used in the formulations according to the present invention. These are conventionally long-chain polyolefins. Several examples of polyolefins contemplated for use herein include those suggested by U.S. Pat. No. 4,092,255, column 1, lines 29-32: polyisobutenes, polymethacrylates, polyalkylstyrenes, partially hydrogenated copolymers of butadiene and styrene, amorphous polyolefins of ethylene and propylene, ethylene-propylene diene polymers, polyisoprene, and styrene-isoprene.

E. Other Dispersants

Other dispersants (i.e. dispersants which are not the graft copolymers described previously) also help suspend insoluble engine oil oxidation products, thus preventing sludge flocculation and precipitation or deposition of particulates on metal parts. Suitable dispersants include high molecular weight alkyl succinimides and the reaction products of oil-soluble polyisobutylene succinic anhydride with ethylene amines such as tetraethylene pentamine and borated salts thereof.

Such conventional dispersants are also contemplated for use herein, although frequently they can be used at reduced concentrations when the grafted polyolefins according to the present invention are used. Several examples of dispersants include those listed in U.S. Pat. No. 4,092,255, column 1, lines 38-41: succinimides or succinic esters, alkylated with a polyolefin of isobutene or propylene, on the carbon in the alpha position of the succinimide carbonyl. These additives are useful for maintaining the cleanliness of an engine or other machinery.

F. Detergents

Detergents to maintain engine cleanliness can be used in the present lubricating oil compositions. These materials include the metal salts of sulfonic acids, alkyl phenols, sulfurized alkyl phenols, alkyl salicylates, naphthenates, and other soluble mono- and dicarboxylic acids. Basic (vis, overbased) metal salts, such as basic alkaline earth metal sulfonates (especially calcium and magnesium salts) are frequently used as detergents. Such detergents are particularly useful for keeping the insoluble particulate materials in an engine or other machinery in suspension. Other examples of detergents contemplated for use herein include those recited in U.S. Pat. No. 4,092,255, column 1, lines 35-36: sulfonates, phenates, or organic phosphates of polyvalent metals.

G. Anti-Wear Agents

Anti-wear agents, as their name implies, reduce wear of metal parts. Zinc dialkyldithiophosphates and zinc diaryldithiophosphates and organo molybdenum compounds such as molybdenum dialkyldithiocarbamates are representative of conventional anti-wear agents.

H. Anti-Oxidants

Oxidation inhibitors, or anti-oxidants, reduce the tendency of lubricating oils to deteriorate in service. This deterioration can be evidenced by increased oil viscosity and by the products of oxidation such as sludge and varnish-like deposits on the metal surfaces. Such oxidation inhibitors include alkaline earth metal salts of alkylphenolthioesters having preferably $C_5$ to $C_{12}$ alkyl side chains, e.g., calcium nonylphenol sulfide, dioctylphenylamine, phenyl-alpha-naphthylamine, phosphosulfurized or sulfurized hydrocarbons, and organo molybdenum compounds such as molybdenum dialkyldithiocarbamates.

I. Pour Point Depressants

Pour point depressants, otherwise known as lube oil flow improvers, lower the temperature at which the fluid will flow or can be poured. Such additives are well known. Typical of those additives which optimize the low temperature fluidity of a lubricant are $C_8$-$C_{18}$-dialkylfumarate vinyl acetate copolymers, and polymethacrylates.

J. Minor Ingredients

Many minor ingredients which do not prevent the use of the present compositions as lubricating oils are contemplated herein. A non-exhaustive list of other such additives includes rust inhibitors, as well as extreme pressure additives, friction modifiers, antifoam additives, and dyes.

IV. Test Methods

A. % Nitrogen

This test is used to determine the concentrations of nitrogen on the polyolefin and on the process fluid (assuming the reaction is carried out in a process solvent). The results of this test are used to determine the degree of grafting.

In order to accurately determine the amount of nitrogen grafted onto each of the two components during the grafting reaction, each component in the reaction mixture first must be isolated and then individually analyzed using the ANTEK Elemental Analyzer. This is accomplished as follows.

Prior to analysis, the reaction mixture is separated into its individual components. Sufficient reaction mixture to contain between 0.1 and 0.15 grams of the grafted polyolefin is placed in a suitable glass vial. Sufficient heptane is added to give a resulting solution containing approximately 2% polyolefin solids.

The grafted polyolefin is then precipitated from this solution by slowly adding the solution to a beaker containing an excess of acetone. The precipitate is collected and rinsed several times with acetone. The precipitate is then placed on a watch glass and dried at 60° C. in an oven for about 18 hours. The process fluid (or solvent) used during the grafting process is prepared for analysis by separating the acetone and heptane from the "acetone-heptane" contaminated process fluid.

The two samples, the extracted polyolefin and the process fluid, are then analyzed separately on the ANTEK Elemental Analyzer (Model 9000 VSN Solid Auto Sampler). The total sample response is recorded and the integrated area is determined using ANTEK V366 Software. The instrument response is then calibrated with a suitable standard such as Erucimide (4.148% Nitrogen CAS # 112-84-5). The Calibration data are then utilized to convert the integrated sample area into percentages of nitrogen.

The percentage of nitrogen on the polyolefin (corrected for any residual process fluid in the dried polymer) and on the solvent can be easily converted to the percentage of grafted nitrogenous monomer on the polyolefin by dividing by the percent by weight of nitrogen in the monomer. For example, when the monomer is the reaction product of maleic anhydride and 4-aminodiphenylamine, the percentage of nitrogen on the polyolefin can be converted to the percentage of grafted monomer on the polyolefin by dividing by 0.106 (since the monomer contains about 10.6% nitrogen by weight).

B. Determination of Aromatic Content of Solvent

The aromatic content of the solvent or process fluid used in the grafting reactions is determined by measuring its absorbance over wavelengths ranging from 190 nm to 360 nm in a solution of known concentration. A small amount of the test sample is dissolved in cyclohexane (spectroscopic grade) and the spectrum of the test solution is scanned over the above wavelength range. Measurements are carried out at the peak maxima over the ranges of 190-210 nm, 220-240 nm, and 260-280 nm. These positions correspond to the strongest absorption of mono-, di-, and polycyclic aromatics. Usually the maxima are located at 203 nm, 226 nm, and 270 nm.

The absorbances at these positions, corrected for the baseline cell absorbance, are used to calculate the concentrations of mono-, di-, and polycyclic aromatics. The aromatics total is the sum of the concentrations of these three aromatic species. In carrying out these calculations, the molar absorptivities of the sample, determined at the three specified wavelength ranges, are utilized.

C. Infrared Spectroscopy

Infrared spectroscopy was employed to assess qualitatively the chemical composition of certain grafted products and also to assay the degree of grafting of monomer onto the polymer backbone. The instrument used to collect the data is the Perkin-Elmer Model C 1720 Infrared Fourier Transform Spectrometer. Data was gathered using 4 cm$^{-1}$ resolution.

As previously described in connection with % Nitrogen analysis, prior to analysis, the reaction mixture is separated into its individual components—the grafted polyolefin and process fluid. The procedure to be followed was described previously with respect to the Nitrogen analysis. In contrast with the nitrogen analysis, for this analysis, the liquid phase containing the process fluid need not be retained for purposes of the Infrared analysis.

The extracted polymer is converted into a thin film using a Carver Model C Laboratory Press operated at 8,000 to 10,000 pounds at a temperature of 150° C. The thin film is then aligned in the sample compartment of the spectrometer and a spectrum is collected using 4 wavenumber resolution.

WORKING EXAMPLES

Example 1

Laboratory Preparation of Reaction Product for Grafting

In this example an ethylenically-unsaturated reaction product containing both nitrogen and oxygen was prepared. A 500 ml reactor equipped with an electric heating mantle, stirrer, thermometer and water-cooled reflux condenser was charged with 70 ml of acetone and 5.28 g of maleic anhydride. The maleic anhydride was allowed to dissolve in the acetone. A second solution was prepared containing 9.93 g of 4-aminodiphenylamine dissolved in 50 ml of acetone. The temperature of the maleic anhydride solution was raised to 60° C. While the maleic anhydride-acetone solution was kept at temperature and refluxing, five equal aliquots of the 4-aminodiphenylamine solution were introduced over 140 minutes (35 minutes intervals between aliquot additions). The reaction proceeded for an additional 90 minutes until the reaction was considered complete based upon TLC spotting. The TLC experiments were carried out using 5 cm×20 cm silica gel 60 $F_{254}$ coated plates marketed by EM Science. The solvent was a mixture of 5.6% by volume ethyl alcohol, 33.3% by volume ethyl acetate and 61.1% by volume heptane. After the reaction was complete, the solution was allowed to cool to room temperature. Upon cooling, the reaction product precipitated from solution. The precipitate was filtered, partially purified and dried. NMR analysis indicated that the reaction product comprised diphenylaminomaleimide and the corresponding amic acid which is believed to be mono-diphenylaminoamide of maleic acid. This reaction product is suitable for grafting onto a polyolefin according to the methods described herein, to provide a dispersent viscosity index improver.

Example 2

Laboratory Preparation of Monomer for Grafting

In this example an ethylenically-unsaturated monomer containing both nitrogen and oxygen was prepared. A 500 ml reactor equipped with an electric heating mantle, stirrer, thermometer and water-cooled reflux condenser was charged with 150 ml of N,N-dimethyl formamide and 20.1 g of maleic anhydride. The reactor temperature was raised to 150° C. and the solution was allowed to reflux at this temperature. While at this temperature, 37.9 g of 4-aminodiphenylamine were quickly introduced into the solution. The reaction proceeded for 120 minutes until the reaction was considered complete based upon TLC spotting as described in Example 1. The N,N-dimethyl formamide was then vacuum stripped and the reaction product was filtered and dried. This reaction product is suitable for grafting onto a polyolefin to provide a dispersant viscosity index improver.

Example 3

Laboratory Preparation of Monomer for Grafting

In this example an ethylenically-unsaturated monomer containing both nitrogen and oxygen was prepared. A 500 ml reactor equipped with an electric heating mantle, stirrer, thermometer and water-cooled reflux condenser was charged with 14.3 ml of N,N-dimethyl formamide and 7.0 g of maleic anhydride. The reactor temperature was raised to 150° C. and the solution was allowed to reflux at this temperature. While at this temperature, 13.2 g of 4-aminodiphenylamine were quickly introduced into the solution. The reaction proceeded for 180 minutes until the reaction was considered complete based upon TLC spotting as described in Example 1. The reaction product, without subsequent purification or separation of components, is suitable for the grafting reaction with a polyolefin to provide a dispersant viscosity index improver.

Example 4

Laboratory Preparation of Graft Polymer

A resin kettle equipped with an electric heating mantle, stirrer, thermometer and gas inlet was charged with 500 g of a polymer solution. The gas inlet permits the gas to be fed either below or above the surface of the solution. The polymer solution was prepared by dissolving 12.5 weight percent polyolefin in a commercially available hydrorefined base stock. The solution was heated to 170° C. During heating the solution was purged with an inerting gas ($CO_2$) fed below the surface of the solution. When the solution reached the temperature of 170° C., the purge gas was redirected to flow over the surface of the polymer solution. With the polymer solution at this temperature, two solutions, one containing monomer from Example 1 and the other containing di-t-butyl peroxide initiator were introduced. The monomer solution was prepared by dissolving 11.6 g of the monomer from Example 1 in 25 ml of THF. The initiator solution was prepared by dissolving 2.4 g of di-t-butyl peroxide in 60 ml of heptane. The monomer solution was metered into the resin kettle over a sixty minutes period. 30 ml of the initiator solution were metered into the resin kettle over the same sixty minutes period. The remaining 30 ml of initiator solution were fed to the reactor over the following sixty minutes period. After all of the reactants were added, the mixture was allowed to react for an additional sixty minutes for a total elapsed reaction time of three hours. After completion of the reaction, the polymer was precipitated using acetone, and then dried, as described above in the section entitled "Test Methods", and then analyzed for percent nitrogen using the ANTEK Elemental Analyzer. An Infrared spectrum of the precipitated polymer exhibited absorbances at 3364 $cm^{-1}$, 1774 $cm^{-1}$, 1708 $cm^{-1}$, 1597 $cm^{-1}$, 1515 $cm^{-1}$ and 748 $cm^{-1}$. The grafted polymer contained 0.53 percent nitrogen using the Antek Elemental Analyzer and had a calculated monomer to polymer mole ratio of about 18.9:1.

Example 5

Laboratory Preparation of Graft Copolymer

A resin kettle was equipped with an electric heating mantle, stirrer, thermometer and gas inlet. The gas inlet permits the gas to be fed either below or above the surface of the solution. The resin kettle was charged with 5 g of an ethylene-propylene copolymer and 95 g of 1,2,4-trichlorobenzene. The reactor was then heated to 170° C. with vigorous stirring for 6 hours until the polymer was fully dissolved. During heating, the solution was purged with an inerting gas fed below the surface of the solution. After dissolution, the polymer solution was allowed to cool to room temperature.

After the polymer solution cooled to room temperature, 0.92 g of monomer from Example 1 was added. The solution was reheated to 170° C. During heating, the solution was purged with an inerting gas fed below the surface of the solution. When the solution reached the reaction temperature of 170° C., the purge was redirected to flow over the surface of the polymer solution. A solution containing 0.12 g of di-t-butyl peroxide in 5 ml of 1,2,4-trichlorobenzene was prepared. This was fed slowly, over a 60 minute period, into the mixture of polymer and monomer. The reaction mixture was then allowed to react for an additional sixty minutes for a total elapsed reaction time of 120 minutes. After completion of the reaction, a small sample (<5 ml) of polymer solution was collected and the polymer precipitated using acetone and then dried as previously described. An Infrared spectrum of the precipitated polymer exhibited absorbances at 3364 $cm^{-1}$, 1774 $cm^{-1}$, 1708 $cm^{-1}$, 1597 $cm^{-1}$, 1515 $cm^{-1}$ and 748 $cm^{-1}$. The grafted polymer contained 0.44 percent nitrogen and had a calculated monomer to polymer mole ratio of about 15.7:1.

Example 6

Laboratory Preparation of Graft Copolymer

The reaction mixture from Example 5 was heated to 170° C. while purging the solution with an inerting gas fed below the surface of the solution. When the solution reached the reaction temperature of 170° C., the purge was redirected to flow over the surface of the reaction mixture and a second charge of initiator was fed into the reaction mixture. Again, the initiator was fed as a solution containing 0.12 g of di-t-butyl peroxide (initiator) in 5 ml of 1,2,4-trichlorobenzene. As previously, the 5 ml were fed slowly into the reaction mixture over a 60 minute period. The reaction mixture was, again, allowed to react for an additional 60 minutes. The total elapsed reaction time for Examples 5 and 6 was four hours. After completion of the reaction, the polymer was precipitated using acetone and then dried. An Infrared spectrum of the precipitated polymer exhibited absorbances at 3364 $cm^{-1}$, 1774 $cm^{-1}$, 1708 $cm^{-1}$, 1597 $cm^{-1}$, 1515 $cm^{-1}$ and 748 $cm^{-1}$. The grafted polymer contained 1.09 percent nitrogen and had a calculated monomer to polymer mole ratio of about 39:1.

Example 7

Laboratory Preparation of Graft Copolymer

A resin kettle equipped with an electric heating mantle, stirrer, thermometer and gas inlet was charged with 500 g of a polymer solution. The gas inlet permits the gas to be fed either below or above the surface of the solution. The polymer solution was prepared by dissolving 12.5 weight percent polyolefin in a commercially available hydrorefined base stock. The solution was heated to 170° C. During heating the solution was purged with an inerting gas ($CO_2$) fed below the surface of the solution. When the solution reached the temperature of 170° C., the purge gas was redirected to flow over the surface of the polymer solution. With the polymer solution at temperature, two solutions, one containing monomer from Example 3 and the other containing di-t-butyl peroxide, were introduced. The monomer solution was prepared by bringing the volume of monomer from Example 3 up to 50 ml by diluting with THF (Tetrahydrofuran). The initiator solution was prepared by dissolving 3.0 g of di-t-butyl peroxide in 60 ml of heptane. The monomer solution was metered into the resin kettle over a sixty minutes period. 30 ml of the initiator solution were metered into the resin kettle over the same 60 minute period. The mixture was allowed, then, to react for an additional 30 minutes for a total elapsed reaction time of 150 minutes. After completion of the reaction, the polymer was precipitated with acetone, dried as previously described, and then analyzed for percent nitrogen using the ANTEK Elemental Analyzer. An Infrared spectrum of the precipitated polymer exhibited absorbances at 3364 $cm^{-1}$, 1774 $cm^{-1}$, 1708 $cm^{-1}$, 1597 $cm^{-1}$, 1515 $cm^{-1}$ and 748 $cm^{-1}$. The grafted polymer contained 0.22 percent nitrogen using the ANTEK Elemental Analyzer and had a calculated monomer to polymer mole ratio of about 7.9:1.

Example 8

Laboratory Preparation of Graft Copolymer

The reaction mixture from Example 7 is heated to 170° C. while purging the solution with an inerting gas fed below the surface of the solution. When the solution reaches the reaction temperature of 170° C., the purge is redirected to flow over the surface of the reaction mixture and a second charge of initiator is fed into the reaction mixture to continue the reaction. The initiator, for example, is fed as a solution containing about 1.5 g of di-t-butyl peroxide in 30 ml of heptane. The 30 ml is fed slowly into the reaction mixture over a 60 minute period. The reaction mixture is allowed to react for an additional 60 minutes. The total elapsed reaction time for Examples 7 and 8 is 120 minutes. After completion of the reaction, the polymer is precipitated using acetone and then dried. An Infrared spectrum of the precipitated polymer exhibits absorbances at 3364 cm$^{-1}$, 1774 cm$^{-1}$, 1708 cm$^{-1}$, 1597 cm$^{-1}$, 1515 cm$^{-1}$ and 748 cm$^{-1}$ and exhibits a monomer to polymer mole ratio of about 12:1.

Example 9

Laboratory Preparation of Monomer for Grafting

In this example an ethylenically-unsaturated monomer containing both nitrogen and oxygen is prepared. A 500 ml reactor equipped with an electric heating mantle, stirrer, thermometer and water-cooled reflux condenser is charged with 70 ml of acetone and 5.28 g of maleic anhydride. The maleic anhydride is allowed to dissolve in the acetone. A second solution is prepared containing 9.93 g of 4-aminodiphenylamine dissolved in 50 ml of acetone. The temperature of the maleic anhydride solution is raised to 60° C. While refluxing the maleic anhydride solution, the 4-aminodiphenylamine solution is introduced, either slowly, over time, or rapidly into the maleic anhydride solution. The reaction proceeds for an additional 90 minutes until the reaction is considered complete based upon TLC spotting. This reaction product is suitable for grafting onto a polyolefin according to the methods herein, to provide a dispersant viscosity index improver.

Example 10

Melt Reaction Preparation of Graft Copolymer

The extruder used is an oil heated twin screw counter rotating unit having multiple reactant injection ports. It is hot oil heated.

Attentive control of reactant feed rates is highly advisable when carrying out melt or extruder reactions. The feed system for polymer bales includes a bale cutter to cut the bales, a grinder to granulate the polymer, and a conveyor and weigh-belt to feed the ground polymer to the extruder hopper. This system is designed to deliver the polyolefin, at a continuous and uniform rate in order to meet the targeted polymer feed rate. The ground polymer is conveyed along the extruder and melted within the inlet zone of the extruder.

The feed systems for the other reactants are also capable of delivering the reactants under controlled conditions. The monomer reaction mixture, prepared in accordance with the procedure as outlined in Example 3, is metered into the extruder using a Variable Speed Metering Pump capable of delivering fluids at discharge pressures of up to 1500 psig. This system is capable of-delivering the monomer at a continuous and uniform rate in order to meet the targeted monomer feed rate, which is desirable for a melt reaction.

The peroxide initiator solution is also metered with a variable speed metering pump capable of delivering fluids at discharge pressures of up to 1500 psig. This system is, as noted, is capable of delivering the peroxide at a continuous and uniform rate in order to meet the targeted peroxide feed rate.

By setting appropriate conditions of temperature and reactant feed rates, the monomer is grafted onto the melt polymer forming a graft polyolefin exhibiting absorbances at 3364 cm$^{-1}$, 1774 cm$^{-1}$, 1708 cm$^{-1}$, 1597 cm$^{-1}$, 1515$^{-1}$ cm and 748 cm$^{-1}$. If desired, multiple monomer and initiator feed ports may be used.

The graft polymer is either formed into pellets or is dissolved in an appropriate solvent thereby forming a dispersant viscosity index improver in convenient form for transport and use to prepare lubricating oil compositions.

Example 11

Alternate Reaction Components

The experiments of Examples 1-10 are repeated, using conditions similar to those of the previous Examples, with each possible combination of the acylating agents, amines, solvents, polyolefins, graftable monomers, and initiators identified earlier in this application. Grafted polyolefins are formed which have utility for increasing the viscosity index of a lubricating oil.

What is claimed is:

1. A method of making a dispersant viscosity index improver, comprising the steps of:
    A. providing (i) a graftable polyolefin, (ii) a reaction product of an acylating agent having at least one point of ethylenic unsaturation and an amine, wherein the amine is selected from the group consisting of primary amines and secondary amines, and wherein the reaction product is provided in an amount sufficient for a molar ratio of reaction product to polyolefin of at least about 1:1, and (iii) an initiator in an amount sufficient to graft at least about 1 mole of the reaction product per mole of the polyolefin;
    B. forming a polyolefin mixture comprising the polyolefin and a solvent;
    C. adding the reaction product to the polyolefin mixture;
    D. adding the initiator to the polyolefin mixture;
    E. heating the polyolefin mixture to at least the initiation temperature of the initiator;
    thereby forming a graft copolymer having a molar ratio of grafted reaction product to polyolefin of at least about 0.5:1, in which method graftable, ethylenically unsaturated, aliphatic or aromatic nitrogen- and oxygen-containing compounds in the reaction product are not recovered from the reaction product before carrying out the grafting reaction.

2. The method of claim 1, wherein step (A) comprises providing at least about 2 moles of the reaction product per mole of the polyolefin, and the method forms a graft copolymer having a molar ratio of grafted reaction product to polyolefin of at least about 2:1.

3. The method of claim 1, wherein step (A) comprises providing at least about 8 moles of the reaction product per mole of the polyolefin, and the method forms a graft copolymer having a molar ratio of grafted reaction product to polyolefin of at least about 8:1.

4. The method of claim 1, wherein step (A) comprises providing at least about 13 moles of the reaction product per mole of the polyolefin, and the method forms a graft copolymer having a molar ratio of grafted reaction product to polyolefin of at least about 13:1.

5. The method of claim 1, wherein step (D) is repeated at least once, thereby increasing the moles of the reaction product grafted onto the polyolefin.

6. The method of claim 1, wherein the polyolefin is dissolved in a solvent, and the solvent comprises a base oil or a light volatile hydrocarbon.

7. The method of claim 6, wherein the solvent contains less than about 50% by weight of aromatic constituents.

8. The method of claim 6, wherein the solvent contains less than about 30% by weight of aromatic constituents.

9. The method of claim 6, wherein the solvent contains less than about 25% by weight of aromatic constituents.

10. The method of claim 6, wherein the solvent contains less than about 20% by weight of aromatic constituents.

11. The method of claim 6, wherein the solvent contains less than about 15% by weight of aromatic constituents.

12. The method of claim 6, wherein the solvent contains less than about 10% by weight of aromatic constituents.

13. The method of claim 1, wherein the reaction product is added to the polyolefin mixture substantially simultaneously with the initiator, at a rate of addition in the range of from about 0.1% per minute to about 100% per minute of the charge of the reaction product.

14. The method of claim 1, wherein the initiator is added to the polyolefin mixture only after substantially all the reaction product has been added to the polyolefin mixture.

15. The method of claim 1, wherein the initiator is added to the polyolefin mixture at substantially the same rate as the reaction product, wherein the rate is measured as a percentage of the entire charge added per minute.

16. The method of claim 1, wherein the initiator is added to the polyolefin mixture at a faster rate than the reaction product is added to the polyolefin mixture, wherein the rate is measured as a percentage of the entire charge added per minute.

17. The method of claim 1, wherein the initiator is added to the polyolefin mixture at a slower rate than the reaction product is added to the polyolefin mixture, wherein the rate is measured as a percentage of the entire charge added per minute.

18. The method of claim 17, wherein the initiator addition rate and the reaction product addition rate are such that there is an excess of reaction product present in the polyolefin mixture during essentially the entire reaction.

19. The method of claim 1, wherein the initiator addition rate and the reaction product addition rate are such that the ratio of unreacted initiator to unreacted reaction product remains substantially constant during essentially the entire reaction.

20. The method of claim 1, wherein the acylating agent is selected from the group consisting of monounsaturated $C_4$ to $C_{50}$ dicarboxylic acids; monounsaturated $C_3$ to $C_{50}$ monocarboxylic acids; anhydrides thereof; and combinations of any of the foregoing.

21. The method of claim 1, wherein the acylating agent is selected from the group consisting of acrylic acid, crotonic acid, methacrylic acid, maleic acid, maleic anhydride, fumaric acid, itaconic acid, itaconic anhydride, citraconic acid, citraconic anhydride, mesaconic acid, glutaconic acid, chloromaleic acid, aconitic acid, methylcrotonic acid, sorbic acid, 3-hexenoic acid, 10-decenoic acid, 2-pentene-1,3,5-tricarboxylic acid, cinnamic acid, and $C_1$ to $C_4$ alkyl acid esters of the foregoing, and combinations of the foregoing.

22. The method of claim 1, wherein the acylating agent is maleic acid.

23. The method of claim 1, wherein the acylating agent is maleic anhydride.

24. The method of claim 1, wherein the amine is selected from the group consisting of alkyl amines, alkyl polyamines, polyoxyalkylene polyanilnes and amino-aromatic compounds.

25. The method of claim 1, wherein the amine comprises an amino-aromatic compound having the formula:

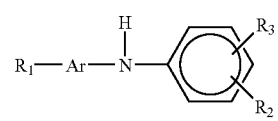

in which Ar is an aromatic ring,
$R_1$ is hydrogen, —NH-aryl, —NH-arylalkyl, —NH-alkylaryl, or a branched or straight chain radical having from 4 to 24 carbon atoms and the radical is an alkyl, alkenyl, alkoxyl, arylalkyl, alkylaryl, hydroxyalkyl or aminoalkyl radical,
$R_2$ is —$NH_2$, —$(NH(CH_2)_n—)_m$—$NH_2$, —$CH_2$—$(CH_2)_n$—$NH_2$, or -aryl-$NH_2$, in which n and m each has a value from 1 to 10, and
$R_3$ is hydrogen or an alkyl, alkenyl, alkoxyl, aralkyl or alkaryl radical, having from 4 to 24 carbon atoms.

26. The method of claim 25, wherein the amino-aromatic compound is 4-aminodiphenylamine.

27. The method of claim 26, wherein the acylating agent is maleic acid.

28. The method of claim 26, wherein the acylating agent is maleic anhydride.

29. The method of claim 1, wherein the amine comprises an amino-aromatic compound having the formula:

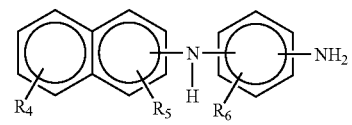

in which $R_4$, $R_5$ and $R_6$ are hydrogen or a linear or branched hydrocarbon radical containing from 1 to 10 carbon atoms and the radical is an alkyl, alkenyl, alkoxyl, alkyaryl, aryalkyl, hydroxyalkyl, or aminoalkyl radical, and $R_4$, $R_5$ and $R_6$ are the same or different.

30. The method of claim 1, wherein the amine is an amino-aromatic compound is selected from the group consisting of aminocarbazoles, aniinoindoles, amino-indazolinones, aninomercaptotriazole, and aminoperimidines.

31. The dispersant viscosity index improver produced by the method of claim 1.

32. A method of making a graft copolymer which is a graft reaction product of an ethylenically unsaturated, oxygen- and nitrogen-containing, aliphatic or aromatic reaction product grafted on a polyolefin backbone,
the method comprising the steps of (1) reacting an amine and an acylating agent having at least one point of ethylenic unsaturation to form a reaction product, wherein the amine is selected from the group consisting of primary amines and secondary amines, and (2) grafting at least a portion of the reaction product onto a polyolefin backbone to form a grafted copolymer, wherein the molar proportion of the grafted portion of the reaction product to the polyolefin backbone is at least about 0.5:1, in which method graftable, ethylenically unsaturated, aliphatic or aromatic nitrogen- and oxygen-containing compounds in the reaction product of step (1) are not recovered from the reaction product before carrying out the grafting reaction.

33. The method of claim 32, wherein said acylating agent is selected from the group consisting of monounsaturated $C_4$ to $C_{50}$ dicarboxylic acids; monounsaturated $C_3$ to $C_{50}$ monocarboxylic acids; anhydrides thereof, and combinations of any of the foregoing.

34. The method of claim 32, wherein the acylating agent is selected from the group consisting of acrylic acid, crotonic acid, methacrylic acid, maleic acid, maleic anhydride, fumaric acid, itaconic acid, itaconic anhydride, citraconic acid, citraconic anhydride, mesaconic acid, glutaconic acid, chioromaleic acid, aconitic acid, methyicrotonic acid, sorbic acid, 3-hexenoic acid, 10-decenoic acid, 2-pentene-1,3,5-tricarboxylic acid, cinnamic acid, and $C_1$ to $C_4$ alkyl acid esters of the foregoing, and combinations of the foregoing.

35. The method of claim 32, wherein the acylating agent is maleic acid.

36. The method of claim 32, wherein the acylating agent is maleic anhydride.

37. The method of claim 32, wherein the amine is selected from the group consisting of alkyl amines, alkyl polyamines, polyoxyalkylene polyamines and amino-aromatic compounds.

38. The method of claim 32, wherein the amine comprises an amino-aromatic compound having the formula:

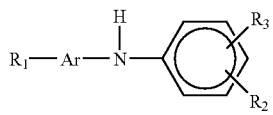

in which Ar is an aromatic ring,
R_1 is hydrogen, —NH-aryl, —NH-arylalkyl, —NH-alkylaryl, or a branched or straight chain radical having from 4 to 24 carbon atoms and the radical is an alkyl, alkenyl, alkoxyl, arylalkyl, alkylaryl, hydroxyalkyl or aminoalkyl radical,
$R_2$ is —$NH_2$, —$(NH(CH_2)_n—)_m$—$NH_2$, —$CH_2$—$(CH_2)_n$—$NH_2$, or -aryl-$NH_2$, in which n and m each has a value from 1 to 10, and
$R_3$ is hydrogen or an alkyl, alkenyl, alkoxyl, aralkyl or alkaryl radical, having from 4 to 24 carbon atoms.

39. The method of claim 38, wherein said amino-aromatic compound is 4-aminodiphenylamine.

40. The method of claim 32, wherein the amine comprises an amino-aromatic compound having the formula:

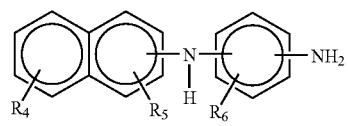

in which $R_4$, $R_5$ and $R_6$ are hydrogen or a linear or branched hydrocarbon radical containing from 1 to 10 carbon atoms and the radical is an alkyl, alkenyl, alkoxyl, alkyaryl, aryalkyl, hydroxyalkyl, or aminoalkyl radical, and $R_4$, $R_5$ and $R_6$ are the same or different.

41. The method of claim 32, wherein the amine is an amino-aromatic compound selected from the group consisting of aminocarbazoles, aminoindoles, amino-indazolinones, aminomercaptotriazole, and aminoperimidines.

42. The method of claim 32, wherein the polyolefin backbone is selected from the group consisting of olefin homopolymers, copolymers and terpolymers.

43. The method of claim 32, wherein the polyolefin backbone is selected from the group consisting of polyethylene, polypropylene, ethylene-propylene copolymers, and ethylene/propylene/diene copolymers.

44. The method of claim 32, wherein the polyolefin backbone is selected from the group consisting of polyisobutene, polymethacrylates, polyalkyistyrenes, partially hydrogenated polyolefins of butadiene and styrene.

45. The method of claim 32, wherein the polyolefin backbone is selected from the group consisting of ethylene/propylene/octene terpolymers, and ethylene/propylene/ethylidene-norbornene terpolymers, ethylene/propylene/hexadiene terpolymers.

46. The graft copolymer produced by the method of claim 32.

47. A method of making a dispersant viscosity index improver, comprising the steps of:
A. providing (i) a graftable polyolefin, (ii) a reaction product of an acylating agent having at least one point of ethylenic unsaturation and an amine, wherein the amine is selected from the group consisting of primary amines and secondary amines, wherein the reaction product is provided in an amount sufficient for a molar ratio of reaction product to polyolefin of at least about 0.5:1, and (iii) an amount of an initiator sufficient to graft at least about 1 mole of the reaction product per mole of the polyolefin;
B. melt-reacting a mixture consisting essentially of the reaction product, the polyolefin and the initiator, the melt-reacting step being carried out at a temperature and under conditions effective to graft the reaction product on at least some of the graftable sites of the graftable polyolefin;
thereby forming a graft copolymer having at least about 1 mole of the reaction product per mole of the polyolefin,
in which method graftable, ethylenically unsaturated, aliphatic or aromatic nitrogen- and oxygen-containing compounds in the reaction product are not recovered from the reaction product before carrying out the grafting reaction.

48. The method of claim 47, wherein step (A) comprises providing at least about 2 moles of the reaction product per mole of said polyolefin.

49. The method of claim 47, wherein step (A) comprises providing at least about 8 moles of the reaction product per mole of said polyolefin.

50. The method of claim 47, wherein step (A) comprises providing at least about 13 moles of the reaction product per mole of said polyolefin.

51. The method of claim 47, wherein multiple melt-reaction sites are provided by the melt reactor.

52. The method of claim 47, wherein said acylating agent is selected from the group consisting of monounsaturated $C_4$ to $C_{50}$ dicarboxylic acids; monounsaturated $C_3$ to $C_{50}$ monocarboxylic acids; anhydrides thereof, and combinations of any of the foregoing.

53. The method of claim 47, wherein the acylating agent is selected from the group consisting of acrylic acid, crotonic acid, methacrylic acid, maleic acid, maleic anhydride, fumaric acid, itaconic acid, itaconic anhydride, citraconic acid, citraconic anhydride, mesaconic acid, glutaconic acid, chloromaleic acid, aconitic acid, methylcrotonic acid, sorbic acid, 3-hexenoic acid, 10-decenoic acid, 2-pentene-1,3,5-tricarboxylic acid, cinnamic acid, and $C_1$ to $C_4$ alkyl acid esters of the foregoing, and combinations of the foregoing.

54. The method of claim 47, wherein the acylating agent is maleic acid.

55. The method of claim 47, wherein the acylating agent is maleic anhydride.

56. The method of claim 47, wherein the amine is selected from the group consisting of alkyl amines, alkyl polyamines, polyoxyalkylene polyamines and amino-aromatic compounds.

57. The method of claim 47, wherein the amine comprises an amino-aromatic compound having the formula:

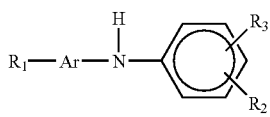

in which Ar is an aromatic ring, $R_1$ is hydrogen, —NH -aryl, —NH-arylalkyl, —NH-alkylaryl, or a branched or straight chain radical having from 4 to 24 carbon atoms and the radical is an alkyl, alkenyl, alkoxyl, arylalkyl, alkylaryl, hydroxyalkyl or aminoalkyl radical, $R_2$ is —$NH_2$, —$(NH(CH_2)_n)_m$—$NH_2$, —$CH_2$—$(CH_2)_n$—$NH_2$, or -aryl-$NH_2$, in which n and m each has a value from 1 to 10, and $R_3$ is hydrogen or an alkyl, alkenyl, alkoxyl, aralkyl, or alkaryl radical having from 4 to 24 carbon atoms.

58. The method of claim 57, wherein the amino-aromatic compound is 4-aminodiphenylamine.

59. The method of claim 58, wherein the acylating agent is maleic acid.

60. The method of claim 58, wherein the acylating agent is maleic anhydride.

61. The method of claim 47, wherein the amine comprises an amino-aromatic compound having the formula:

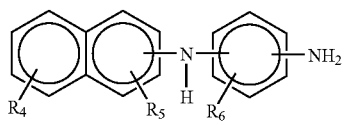

in which $R_4$, $R_5$ and $R_6$ are hydrogen or a linear or branched hydrocarbon radical containing from 1 to 10 carbon atoms and the radical is an alkyl, alkenyl, alkoxyl, alkyaryl, aryalkyl, hydroxyalkyl, or aminoalkyl radical, and $R_4$, $R_5$ and $R_6$ are the same or different.

62. The method of claim 47, wherein the amine is an amino-aromatic compound is selected from the group consisting of aminocarbazoles, aminoindoles, amino-indazolinones, aminomercaptotriazole, and aminoperimidines.

63. The method of claim 47, wherein the polyolefin is melted before the polyolefin is mixed with the reaction product and the initiator.

64. The method of claim 63, wherein at least a portion of the reaction product is mixed with the polyolefin before the initiator is added to the polyolefin.

65. The method of claim 47, wherein the initiator is added to the polyolefin mixture only after substantiaily all the reaction product has been added to the polyolefin mixture.

66. The method of claim 47, wherein the initiator is added to the polyolefin mixture at substantially the same rate as the reaction product.

67. The method of claim 47, wherein the initiator is added to the mixture at a slower rate than the reaction product.

68. The method of claim 47, wherein the melt reacting step is performed in an extruder.

69. The method of claim 68, wherein the reaction product is added in a first zone of the extruder, and the initiator is added in a second zone of the extruder.

70. The method of claim 69, wherein the extruder has a plurality of feed points, and the polyolefin, the reaction product, and the initiator are each fed into separate feed points.

71. The dispersant viscosity index improver produced by the method of claim 47.

72. A method of making a dispersant viscosity index improver, said method comprising the steps of:
A. providing an acylating agent having at least one point of ethylenic unsaturation;
B. providing an amine selected from the group consisting of primary amines and secondary amines;
C. combining the acylating agent and the amine;
D. heating the acylating agent and the amine to form a reaction product;
E. providing a graftable polyolefin and an initiator;
F. melt-reacting a mixture consisting essentially of the reaction product of the acylating agent and the amine with the graftable polyolefin and the initiator, the melt-reacting step being carried out at a temperature and under conditions effective to graft the reaction product on at least some graftable sites of the graftable polyolefin;

thereby forming a graft copolymer of the reaction product on the polyolefin having at least about 1 mole of the reaction product grafted per mole of the polyolefin, in which method graftable, ethylenically unsaturated, aliphatic or aromatic nitrogen- and oxygen-containing compounds in the reaction product are not recovered from the reaction product before carrying out the grafting reaction.

73. The method of claim 72, wherein said acylating agent is selected from the group consisting of monounsaturated $C_4$ to $C_{50}$ dicarboxylic acids; monounsaturated $C_3$ to $C_{50}$ monocarboxylic acids; anhydrides thereof, and combinations of any of the foregoing.

74. The method of claim 72, wherein the acylating agent used for the reaction product is selected from the group consisting of acrylic acid, crotonic acid, methacrylic acid, maleic acid, maleic anhydride, fumaric acid, itaconic acid, itaconic anhydride, citraconic acid, citraconic anhydride, mesaconic acid, glutaconic acid, chloromaleic acid, aconitic acid, methylcrotonic acid, sorbic acid, 3-hexenoic acid, 10-decenoic acid, 2-pentene-1,3,5-tricarboxylic acid, cinnamic acid, and $C_1$ to $C_4$ alkyl acid esters of the foregoing, and combinations of the foregoing.

75. The method of claim 72, wherein the acylating agent is maleic acid.

76. The method of claim 72, wherein the acylating agent is maleic anhydride.

77. The method of claim 72, wherein said amine is selected from the group consisting of alkylene polyamines, polyoxyalkylene polyamines, and amino-aromatic compounds.

78. The method of claim 72, wherein the amine is selected from the group consisting of alkyl amines, alkyl polyamines, polyoxyalkylene polyamines and amino-aromatic compounds.

79. The method of claim 72, wherein the amine comprises an amino-aromatic compound having the formula:

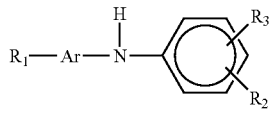

in which Ar is an aromatic ring,
- $R_1$ is hydrogen, —NH-aryl, —NH-arylalkyl, —NH-alkylaryl, or a ranched or straight chain radical having from 4 to 24 carbon atoms and the radical is an alkyl, alkenyl, alkoxyl, arylalkyl, alkylaryl, hydroxyalkyl or aminoalkyl radical,
- $R_2$ is —$NH_2$, —$(NH(CH_2)_n—)_m$—$NH_2$, —$CH_2$—$(CH_2)_n$—$NH_2$, or -aryl-$NH_2$, in which n and m each has a value from 1 to 10, and
- $R_3$ is hydrogen or an alkyl, alkenyl, alkoxyl, aralkyl, or alkaryl radical having from 4 to 24 carbon atoms.

80. The method of claim 79, wherein said amino-aromatic compound is 4-aminodiphenylamine.

81. The method of claim 72, wherein the amine comprises an amino-aromatic compound having the formula:

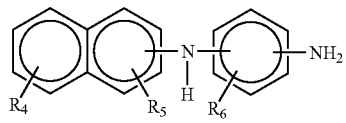

in which $R_4$, $R_5$ and $R_6$ are hydrogen or a linear or branched hydrocarbon radical containing from 1 to 10 carbon atoms and the radical is an alkyl, alkenyl, alkoxyl, alkyaryl, aryalkyl, hydroxyalkyl, or aminoalkyl radical, and $R_4$, $R_5$ and $R_6$ are the same or different.

82. The method of claim 72, wherein the amine is an amino-aromatic compound selected from the group consisting of aminocarbazoles, aminoindoles, amino-indazolinones, aminomercaptotriazole, and aminoperimidines.

83. The method of claim 72, wherein the polyolefin is melted before the polyolefin is mixed with the reaction product and the initiator.

84. The method of claim 82, wherein at least a portion of the reaction product is mixed with the polyolefin before the initiator is mixed with the polyolefin.

85. The dispersant viscosity index improver produced by the method of claim 72.

* * * * *